(12) United States Patent
Peterson

(10) Patent No.: US 12,532,861 B2
(45) Date of Patent: Jan. 27, 2026

(54) ANIMAL TREAT DISPENSER AND TRAINING DEVICE FOR CONTROLLABLE DELIVERY OF LICKABLE TREAT

(71) Applicant: PushPup, LLC, Bethesda, MD (US)

(72) Inventor: Sara Peterson, Bethesda, MD (US)

(73) Assignee: PushPup, LLC, Bethesda, MD (US)

( * ) Notice: Subject to any disclaimer, the term of this patent is extended or adjusted under 35 U.S.C. 154(b) by 97 days.

(21) Appl. No.: 18/531,475

(22) Filed: Dec. 6, 2023

(65) Prior Publication Data

US 2024/0099262 A1    Mar. 28, 2024

Related U.S. Application Data

(63) Continuation-in-part of application No. 18/328,245, filed on Jun. 2, 2023, now abandoned.

(60) Provisional application No. 63/438,376, filed on Jan. 11, 2023, provisional application No. 63/348,490, filed on Jun. 3, 2022.

(51) Int. Cl.
```
A01K 5/01      (2006.01)
A01K 5/02      (2006.01)
A01K 15/02     (2006.01)
```

(52) U.S. Cl.
CPC ............ *A01K 5/0114* (2013.01); *A01K 15/02* (2013.01)

(58) Field of Classification Search
CPC ...... A01K 15/025; A01K 15/02; A01K 5/015; A01K 5/0114; A01K 15/026; A45D 40/08; A45D 40/04; B65D 35/10; B65D 35/14; B65D 83/0072; B65D 83/0055; B65D 1/32; B65D 2231/001
See application file for complete search history.

(56) References Cited

U.S. PATENT DOCUMENTS

| | | | | |
|---|---|---|---|---|
| 4,842,165 A * | 6/1989 | Van Coney | .......... | B65D 83/771 222/105 |
| 5,421,488 A * | 6/1995 | Ehrbar | ...... | B65D 1/32 215/2 |
| 5,516,007 A * | 5/1996 | Larson | ....... | B65D 77/06 222/105 |
| 6,918,511 B1 * | 7/2005 | Spatz | ....... | B65D 83/761 401/175 |
| 8,844,767 B1 * | 9/2014 | Bates | ......... | B65D 47/2031 |
| 9,801,354 B2 * | 10/2017 | Zimmermann | ...... | A01K 15/026 |
| 10,954,039 B1 * | 3/2021 | Iversen | ........ | A23K 50/48 |
| 11,457,610 B1 * | 10/2022 | Johnson | ........ | A01K 15/02 |

(Continued)

OTHER PUBLICATIONS

Himalayan Pet Supply Click-n-lix Dog Training Tool, Chewy.com, website provided: https://www.chewy.com/himalayan-pet-supply-click-n-lix/dp/208165?utm_source=google-product&utm_medium=cpc&utm_content=Himalayan%20Pet%20Supply&utm_campaign=20027453190&utm_term=&qclid=CjwKCAjw4P6oBhBsEiwAKYVkq91mKtWJOpS7INE3rlihX7Vq3amwQe-y-3ryKSegihlsdscMBJ-MsxoCPGgQAvD_BwE, 2020, in 4 pages.

(Continued)

*Primary Examiner* — Kristen C Hayes
(74) *Attorney, Agent, or Firm* — Knobbe, Martens, Olson & Bear, LLP

(57) ABSTRACT

Animal treat dispensing devices are provided. In one aspect, a device includes a housing, a cap, and a clicker. The housing stores a pliable treat. The housing includes an open end. The cap couples to the open end of the housing. The cap includes an opening to dispense the pliable treat. The clicker is at least partially embedded into an outer surface of the animal treat dispensing device. The clicker generates a sound when actuated by a user.

27 Claims, 14 Drawing Sheets

(56) References Cited

U.S. PATENT DOCUMENTS

| | | | | |
|---|---|---|---|---|
| 2012/0067290 | A1* | 3/2012 | Mainini | A01K 15/02 |
| | | | | 119/72 |
| 2013/0233246 | A1* | 9/2013 | Wang | A01K 15/025 |
| | | | | 119/51.01 |
| 2014/0048017 | A1* | 2/2014 | Mainini | A01K 15/02 |
| | | | | 119/51.01 |
| 2015/0296743 | A1 | 10/2015 | Pietrocarlo et al. | |
| 2016/0366852 | A1* | 12/2016 | Burroughs | A01K 7/00 |
| 2022/0402684 | A1 | 12/2022 | Shenfield et al. | |
| 2023/0389521 | A1 | 12/2023 | Peterson | |
| 2024/0099262 | A1* | 3/2024 | Peterson | A01K 5/0114 |

OTHER PUBLICATIONS

Train N Treat, Treat Dispenser, website provided: https://trainntreat.com/collections/trainntreat/products/trainntreat, accessed in 2024, in 7 pages.

Pawket Treats Treat Dispenser, website provided: https://www.pawkettreats.com/products/dog-treat-dispenser-graphite, accessed in 2024, in 10 pages.

EZ Treats Dog Treat Dispenser, tailsdesign.com, website provided: https://shop.tailsdesigns.com/products/ez-treat, 2023, in 7 pages.

Heel Pet Treat Dispenser, heelpetproducts.com, website provided: https://heelpetproducts.com/products/treat-dispenser-starter-kit, accessed in 2024, in 5 pages.

Gotoobs Travel Bottle, large liquid dog treat dispenser, cleanrun.com, website provided: https://www.cleanrun.com/product/gotoob_plus_large_3_4_oz/index.cfm, accessed in 2024, in 2 pages.

Humangear Gotoob Travel Bottle, Facebook.com, Boarding Gate, Mar. 28, 2022, website provided: https://m.facebook.com/boardinggatesg/photos/a.1130004483680817/5563798966967991/?type=3, in 1 page.

GoToob Liquid Dog Treat Dispenser, stoerforthedogs.com, website provided: https://storeforthedogs.com/products/liquid-treat-dispenser, 2022, in 6 pages.

Bark Pouch Treat Dispenser for Training, barkpouch.com, website provided: https://www.barkpouch.com/shop/, 2023, in 7 pages.

Bark Pouch Treat Dispenser, hightailhikes.com, accessed in 2024, website provided: https://hightailhikes.com/products/bark-pouch-salmon-ricotta-recipe?variant=43923446792419&currency=USD&utm_medium=product_sync&utm_source=google&utm_content=sag_organic&utm_campaign=sag_organic&gad=1&gclid=CjwKCAjw4P6oBhBsEiwAKYVkg0H2cPs9qaosBndGqslvWjAmeRgYtrQKKP5uBYKTj28hB7stSTZkMhoCPWMQAvD_BwE, in 12 pages.

PureBites Plus Squeezable Gut and Digestion Food Toppings, Chewy.com, website provided: https://www.chewy.com/purebites-plus-squeezables-gut/dp/750766?utm_source=google-product&utm_medium=cpc&utm_content=PureBites&utm_campaign=20394650868&utm_term=&qclid=CjwKCAjw4P6oBhBsEiwAKYVkqwZb-aCTeCrUHgREoAD-1H4bhce9DY1rPvNUfAH0wXyPJzOKm2MAeRoCVv0QAvD_BwE, accessed in 2024, in 6 pages.

West Paw Nut Butter Blueberry and Chia Seed Creamy Dog Treats, 6.2 oz., Petco.com, website provided: https://www.petco.com/shop/en/petcostore/product/west-paw-nut-butter-blueberry-and-chia-seed-creamy-dog-treats-3776699?store_code=1779&mr:device=c&mr:adType=plalocal&cm_mmc=PSH%7cGGL%7cCCY%7cCCO%7cPM%7c0%7ckUMWcWiLY5b1EHQjK6kSR6%7c%7c%7c0%7c0%7c%7c%7c18145199970&gclid=CjwKCAjw4P6oBhBsEiwAKYVkq5RMIqUKSivOp5YsKHerCpZgOA8L_TduczpraTQoc1d2OxbB1Qib5BoCDelQAvD_BwE&gclsrc=aw.ds, accessed in 2024, in 4 pages.

* cited by examiner

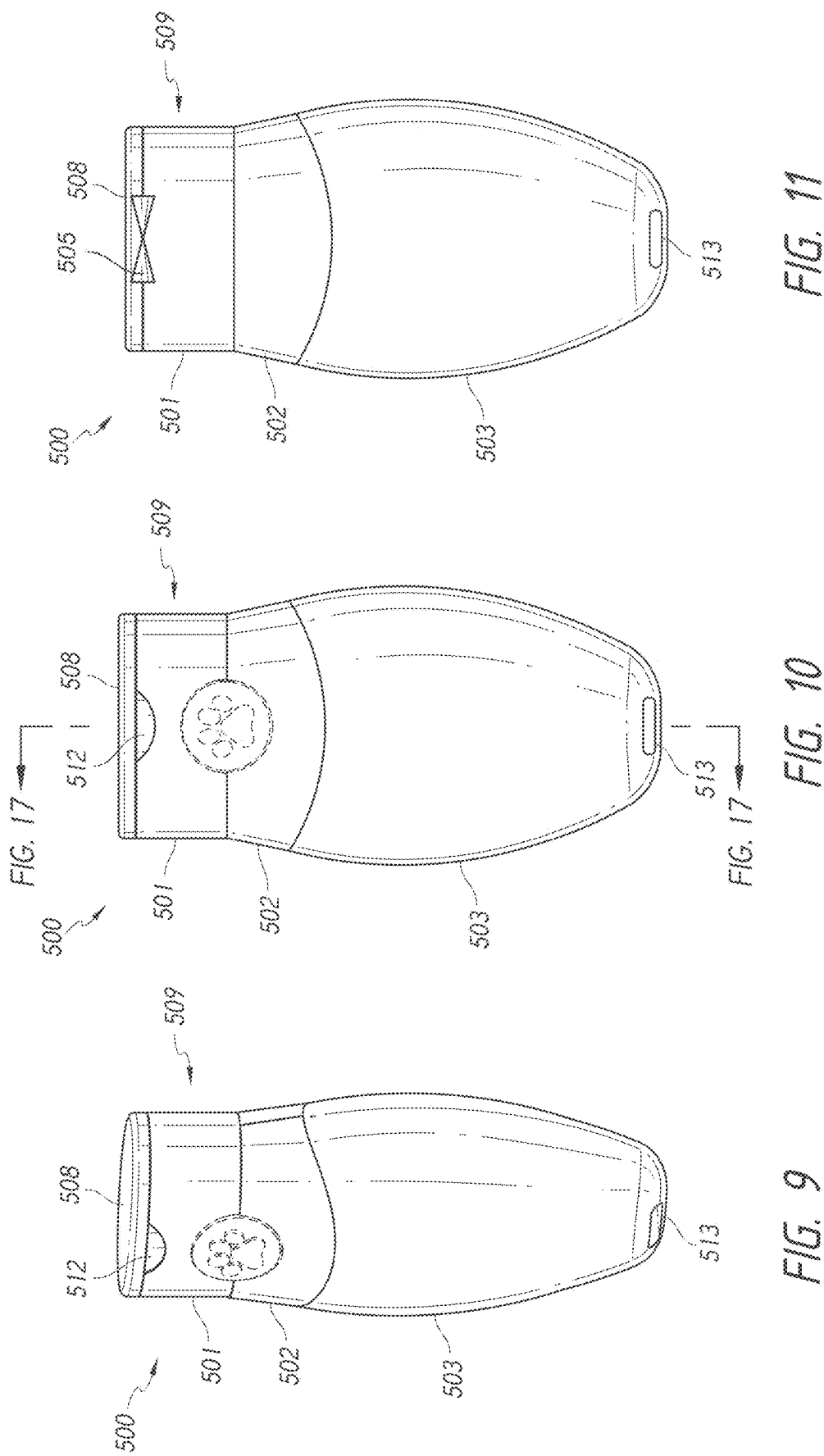

ANIMAL TREAT DISPENSER AND TRAINING DEVICE FOR CONTROLLABLE DELIVERY OF LICKABLE TREAT

CROSS-REFERENCE TO RELATED APPLICATIONS

Any and all applications for which a foreign or domestic priority claim is identified in the Application Data Sheet as filed with the present application are hereby incorporated by reference under 37 CFR 1.57 and made a part of this specification in their entireties for all purposes. For example, the present application is a continuation-in-part of U.S. patent application Ser. No. 18/328,245, filed Jun. 2, 2023, titled "ANIMAL TREAT DISPENSER AND TRAINING DEVICE FOR CONTROLLABLE DELIVERY OF LICKABLE TREAT", which claims priority benefit to U.S. Provisional Application No. 63/438,376, filed Jan. 11, 2023, and U.S. Provisional Application No. 63/348,490, filed Jun. 3, 2022, each of which is incorporated herein by reference for all purposes.

BACKGROUND

Field

The technology relates generally to animal treat dispensers for the delivery of a lickable treat. The device may also function as a training device.

Description of the Related Art

Positive reinforcement training methods, wherein animals are rewarded for desired or requested ("good") behavior, have long been recognized as among the most effective means of training. These kinds of positive reinforcement training methods often employ edible treats as rewards and incentives to help encourage wanted or desirable behaviors or outcomes (e.g., housebreaking, learning tricks and commands, etc.). The efficacy of treat-based training to encourage wanted behaviors relies on the strength of the association between the desired behavior and the reward (i.e., the edible treat); delays between the completion of the desirable behavior and the distribution of the edible treat can diminish the efficacy of training.

Edible treats are also often used to help deter unwanted behaviors (e.g., barking, growling, lunging, snapping, etc.) by helping redirect an animal's attention away from negative stimuli (e.g., other animals) and towards the trainer, owner, or individual in control of the treat. As a result, the use of edible treats as a deterrent may be particularly helpful for individuals training fearful or reactive animals that may be especially prone to these kinds of negative behaviors. Edible treats that are lickable in nature are often particularly effective in this kind of training, and the continuous distribution of these treats (e.g., dispensed through an opening such as a hole, valve, or nozzle) may give the owner or trainer additional control over the animal's behavior, as the dispensing container can be used to gently adjust the animal's position while providing an uninterrupted distribution of the treat contained therein.

Given the prevalence and value of edible treats in animal training regimes, there is value in the development of treat dispensers and training devices that are portable, convenient, easy to store, and easy to use in a variety of contexts and conditions, including while outside or on the go). In particular, there is value in the development of treat dispensers and training devices that may be held and operated with a single hand, leaving the other hand free to maintain control over the animal's movement and behavior.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches or over existing devices for animal treat dispensers.

An animal reward and training device containing a storage compartment housing a lickable treat (e.g., a paste, gel, solid, or semi-solid treat), and a semi-removable component by which the lickable treat may be exposed, dispensed, and re-covered (or sealed) is disclosed. The animal reward and training device includes a proximal and a distal end. The distal end of the device includes a storage compartment in which a lickable treat may be housed and from which the lickable treat may be dispensed to the animal. The proximal end of the device may include one or more openings enclosed by at least one semi-removable dispensing mechanism (e.g., mechanisms such as a flip-top cap, a retractable lid, a rotating, sliding, swivel, lever-based or toggle-based opening, or a one-way valve, etc.). The animal reward and training device in this disclosure is configured to enable (most) users to comfortably hold and operate the device (i.e., open the semi-removable dispensing mechanism of the device, dispense the lickable treat to the pet in a controlled manner, and close the semi-removable dispensing mechanism of the device) using a single hand.

In one aspect, an animal treat dispensing device includes a housing, an auxiliary component, and a cap. The housing stores a pliable treat and has a generally flattened shape. The housing includes a neck having a first width and a rim at an open end of the housing having a second width. The second width is larger than the first width. The auxiliary component is positioned at least partially around the open end of the housing. The auxiliary component has a generally flattened shape and includes a rim. The cap couple to the auxiliary component. The cap includes an opening to dispense the pliable treat. The rim of the housing deforms as the housing is inserted into the auxiliary component and expands to rest on the rim of the auxiliary component.

In some embodiments, the device further includes a clicker at least partially embedded in the auxiliary component. In some embodiments, the housing includes a flexible material. In some embodiments, the auxiliary component includes a recess in an outer surface of the auxiliary component. The cap includes a protrusion extending from an inner surface of the cap, the protrusion configured to be received within the recess in the outer surface of the auxiliary component to secure the cap to the auxiliary component. In some embodiments, the auxiliary component includes a first protrusion extending from an outer surface of the auxiliary component. The cap includes a second protrusion extending from an inner surface of the cap. When the cap is coupled to the auxiliary component, the first protrusion and the second protrusion secure the cap to the auxiliary component. In some embodiments, the auxiliary component includes a press-button structure. The cap includes a through hole. The press-button structure extends through the through hole to secure the cap to the auxiliary component.

In another aspect, an animal treat dispensing device includes a housing and a cap. The housing stores a pliable treat and has a generally flattened shape. The housing includes a flexible portion and rigid portion comprising an open end. The cap couples to the open end of the rigid portion of the housing. The cap has a generally flattened shape and an opening to dispense the pliable treat.

In some embodiments, the device includes a clicker at least partially embedded in the animal treat dispensing device. In some embodiments, the rigid portion of the housing is an auxiliary component separate from the flexible portion of the housing. In some embodiments, the auxiliary component includes a recess in an outer surface of the auxiliary component. The cap includes a protrusion extending from an inner surface of the cap. The protrusion is received within the recess in the outer surface of the auxiliary component to secure the cap to the auxiliary component. In some embodiments, the auxiliary component includes a first protrusion extending from an outer surface of the auxiliary component. The cap includes a second protrusion extending from an inner surface of the cap. When the cap is coupled to the auxiliary component, the first protrusion and the second protrusion secure the cap to the auxiliary component. In some embodiments, the auxiliary component includes a press-button structure. The cap includes a through hole, the press-button structure configured to extend through the through hole to secure the cap to the auxiliary component. In some embodiments, the flexible portion of the housing and the rigid portion of the housing form an integral structure. In some embodiments, the rigid portion of the housing includes a recess in an outer surface of the rigid portion. The cap includes a protrusion extending from an inner surface of the cap. The protrusion is received within the recess in the outer surface of the rigid portion to secure the cap to the housing. In some embodiments, the rigid portion includes a first protrusion extending from an outer surface of the rigid portion. The cap includes a second protrusion extending from an inner surface of the cap. When the cap is coupled to the rigid portion of the housing, the first protrusion and the second protrusion secure the cap to the housing. In some embodiments, the rigid portion includes a press-button structure. The cap includes a through hole. The press-button structure extends through the through hole to secure the cap to the housing.

In another aspect, an animal treat dispensing device includes a housing, a cap, and a clicker. The housing stores a pliable treat. The housing includes an open end. The cap couples to the open end of the housing. The cap includes an opening to dispense the pliable treat. The clicker is at least partially embedded into an outer surface of the animal treat dispensing device. The clicker generates a sound when actuated by a user.

In some embodiments, the clicker is at least partially embedded into an outer surface of the cap. In some embodiments, the device includes an auxiliary component. The auxiliary component couples the cap to the open end of the housing. The clicker is at least partially embedded into an outer surface of the auxiliary component. In some embodiments, the cap includes a cut-out configured to partially surround the clicker.

In another aspect, an animal treat dispensing device includes a housing, an auxiliary component, and a cap. The housing includes an open end. The housing is configured to store a pliable treat. The auxiliary component is configured to be positioned at least partially around the open end of the housing. The auxiliary component includes a first protrusion and a clicker. The first protrusion extends from an outer surface of the auxiliary component. The clicker is at least partially embedded in the auxiliary component. The cap is configured to couple to the auxiliary component. The cap includes an opening to dispense the pliable treat and a second protrusion extending from an inner surface of the cap. When the cap is coupled to the auxiliary component, the first protrusion and the second protrusion secure the cap to the auxiliary component.

In some embodiments, a width of the housing exceeds a depth of the housing. In some embodiments, the auxiliary component is configured to flatten the housing, the housing includes a flexible material. In some embodiments, the cap includes a cut-out configured to partially surround the clicker. In some embodiments, the housing comprises a through hole configured to couple to one or more of a keychain, a lanyard, and a retractable key holder. In some embodiments, the device further includes a storage component. In some embodiments, the device further includes a flashlight. In some embodiments, the housing includes a temperature-insulating material. In some embodiments, the housing comprises a rigid external layer. In some embodiments, the housing comprises a divider configured to separate two compartments within the housing and wherein the cap comprises a second opening.

In another aspect, an animal treat dispensing device includes a housing, an auxiliary component and a cap. The housing includes an open end. The housing is configured to store a pliable treat. The auxiliary component is configured to be positioned at least partially around the open end of the housing. The auxiliary component includes a first recess and an opening. The first recess is in an outer surface of the auxiliary component. The opening is configured to receive a clicker. The cap is configured to couple to the auxiliary component. The cap includes an opening to dispense the pliable treat. The cap includes a first protrusion extending from an inner surface of the cap. The first protrusion is configured to be received within the first recess in the outer surface of the auxiliary component to secure the cap to the auxiliary component.

In some embodiments, a width of the housing exceeds a depth of the housing. In some embodiments, the auxiliary component is configured to flatten the housing, the housing comprising a flexible material. In some embodiments, the housing includes a through hole configured to couple to one or more of a keychain, a lanyard, and a retractable key holder. In some embodiments, the device includes a storage component. In some embodiments, the device includes a flashlight. In some embodiments, the housing includes a temperature-insulating material. In some embodiments, the housing includes a rigid external layer. In some embodiments, the device includes a second recess in the outer surface of the auxiliary component and a second protrusion extending from the inner surface of the cap. The second protrusion is configured to be received within the second recess. In some embodiments, the housing includes a divider configured to separate two compartments within the housing. The cap includes a second opening.

In another aspect, an animal treat dispensing device includes a housing, an auxiliary component, and a cap. The housing is configured to store a pliable treat and has a generally flattened shape. The housing includes a neck having a first diameter and a rim having a second diameter. The second diameter is larger than the first diameter. The auxiliary component is configured to be positioned at least partially around the open end of the housing. The auxiliary component has a generally flattened shape and includes a rim. The cap is configured to couple to the auxiliary component. The cap includes an opening to dispense the pliable treat. The rim of the housing is configured to deform as the housing is inserted into the auxiliary component and expand to rest on the rim of the auxiliary component.

In some embodiments, the device includes a clicker at least partially embedded in the auxiliary component. In some embodiments, the housing includes a flexible material.

In some embodiments, the cap is a semi-openable cap that is operated with a single hand. In some embodiments, the semi-openable cap is a flip-top cap.

In some embodiments, the device includes an opening extending through the housing, the opening configured to couple to at least one of a lanyard, leash, a retractable key holder, and keychain. In some embodiments, the housing comprises a temperature-insulating material. In some embodiments, the device includes a storage component coupled to the housing.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure. The drawings as depicted are not necessarily drawn to scale. The relative dimensions and proportions as shown are not intended to limit the present disclosure.

FIG. 9 illustrates a perspective view of another example embodiment of an animal treat dispensing device;

FIG. 10 illustrates a front view of the animal treat dispensing device of FIG. 9;

FIG. 11 illustrates a back view of the animal treat dispensing device of FIG. 9;

DETAILED DESCRIPTION

Figure 1:
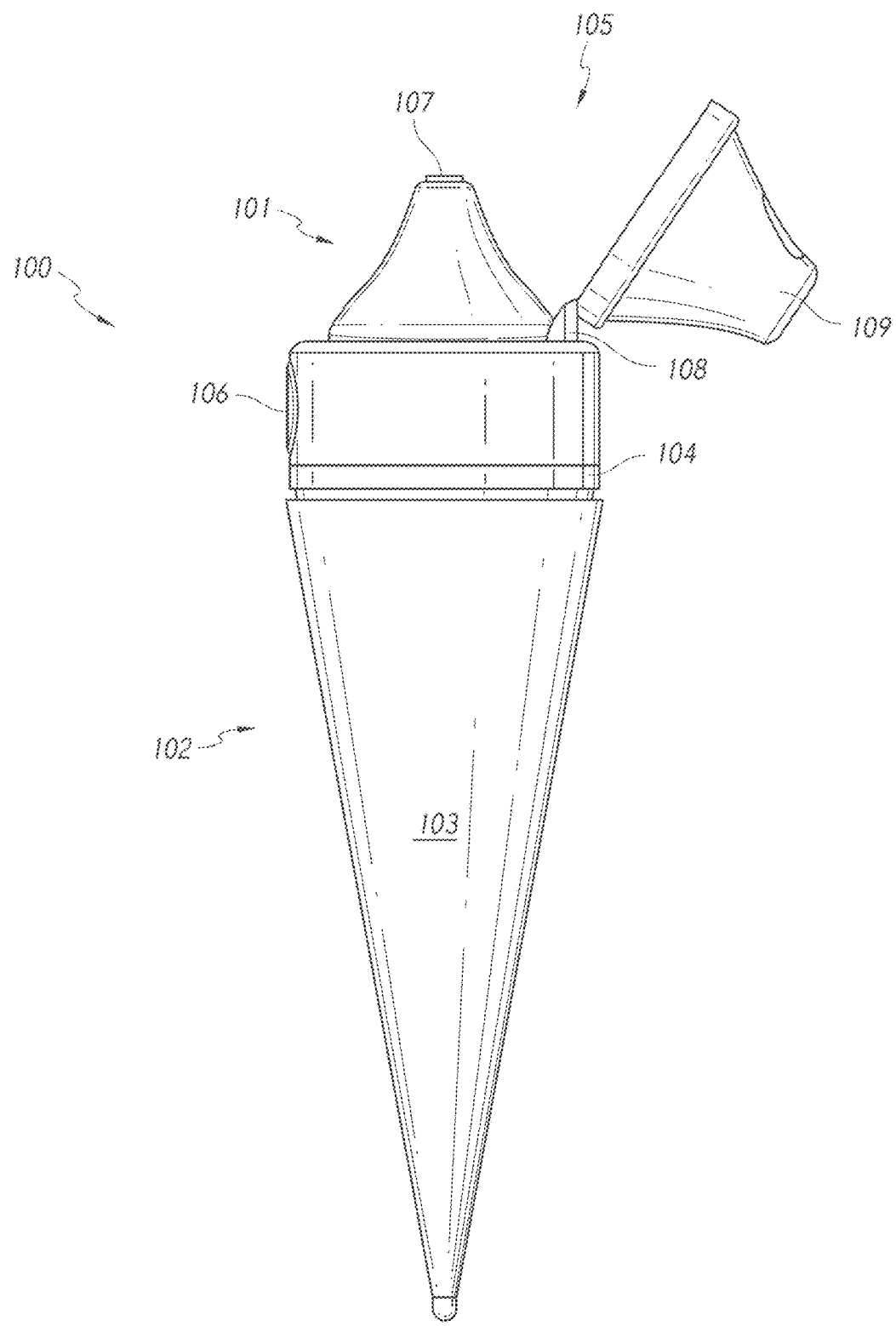
FIG. 1 illustrates a side view of an example embodiment of an animal treat dispensing device.

The embodiments presented in this disclosure are intended to illustrate the certain features of the training device. Accordingly, it is to be understood that the embodiments of the training device subsequently disclosed are illustrative of some potential embodiments of the device and should not be taken as representative of all potential embodiments of this device.

An animal reward and training device containing a storage compartment housing a lickable treat (e.g., a paste, gel, solid, or semi-solid treat), and a semi-removable component by which the lickable treat may be exposed, dispensed, and re-covered (or sealed) is disclosed. The animal reward and training devices according to the present disclosure are advantageous as the devices can be enable (most) users to comfortably hold and operate the device (i.e., open the semi-removable dispensing mechanism of the device, dispense the lickable treat to the pet in a controlled manner, and close the semi-removable dispensing mechanism of the device) using a single hand. The devices are also advantageous in that they can slim or flat designs to allow easy storage on a user's person, for example, in a pocket, purse, bag, etc. Additionally, the devices can be advantageous in that they can incorporate a clicker device to assist in training activities. For example, the clicker device can make a sound to gain an animal's attention prior to dispensing a treat.

Additionally, it can be advantageous that a user can access the device from its storage location (e.g., a pocket, purse, bag, etc.) and then click or activate the clicker all with a single hand. This can allow the user to hold a leash or perform another task with their other hand.

The animal reward and training device may include a proximal and a distal end. The distal end of the device may comprise a storage compartment or housing in which at least one lickable treat may be housed. In some embodiments, the materials comprising the housing for the lickable treat may comprise thermally insulating materials. The distal end of the device may enable the lickable treat housed therein to be controllably extruded into the proximal end of the device and dispensed to the animal in a number of ways. In some embodiments of the device, the nature of the treat compartment itself may be such that the user may directly manipulate the treat compartment to extrude the lickable treat from the treat compartment (e.g., the treat compartment may comprise a flexible material such as silicone or rubber that may be squeezed, rolled, or otherwise manipulated to control the extrusion and dispensing of a pliable lickable treat). In such embodiments in which the treat chamber is flexible or partially flexible, the user may control the rate at which the treat is dispensed by exerting more or less force on the walls of the treat compartment. In some embodiments of the device, the treat compartment may include a mechanism (e.g., a lever-type mechanism or a screw-type mechanism) that may facilitate the extrusion of the lickable treat from the treat compartment so it may be dispensed to the animal. In such embodiments, the user may use said mechanism to control the rate at which the treat is dispensed to the animal.

The proximal end of the device may include at least one opening through which the lickable treat may be dispensed from the device. These opening(s) may be accompanied by a mechanism or structure by which the opening may be sealed (thus securely encasing the treat within the confines of the device) and unsealed (thus exposing the lickable treat enclosed in the device and enabling it to be dispensed) by the manipulation of associated structures or mechanisms that are here described as "semi-removable dispensing mechanisms". These semi-removable dispensing mechanisms may include any kind of structure or mechanism that may be used to reliably open and shut the opening in the device without ever fully separating from the main structure of the device (potential semi-removable dispensing mechanisms may include, for example, flip-top caps or flip-top lids, retractable lids or tops, a rotating, sliding, swivel, or toggle-based openings; semi-removable dispensing mechanisms may include one-way valves that may themselves comprise a semi-removable dispensing mechanism or may be used in combination with other mechanisms).

In this disclosure, the term 'semi-removable dispensing mechanism' may be used to refer to structures or mechanisms in the device that may be used to seal and reseal openings in the device, or it may more generally be used to refer to said structures or mechanisms along with the openings with which they are associated.

The semi-removable dispensing mechanism(s) included in the device may be designed so as to be opened and closed using a single hand, thus enabling the user to use the other hand to control the animal in question. This attribute of the semi-removable dispensing mechanism, coupled with the ability to control the extrusion of the lickable treat from the treat compartment with a single hand, may enable the training device to be fully operated using a single hand.

The opening(s) through which the lickable treat is dispensed may vary in size. The preferred embodiment for, for example, less-viscous lickable substances may include smaller opening(s) through which the lickable substance may be dispensed, while the preferred embodiment for more-viscous substances may include larger opening(s) through which the lickable substance may be dispensed. Some embodiments of the device may include two or more openings on the proximal end of similar or various sizes that may be alternatively used according to user preference. Other embodiments of the device may include an opening that may be modified (e.g., made larger or smaller) based on user preference, while other embodiments of the device may include modular openings of various sizes and shapes that may be interchanged. Some embodiments of the device may include a one-way valve that could be embedded in the opening to help facilitate control over the dispensing of the lickable treat.

The lickable treat enclosed in the distal end of the device may be dispensed in a number of ways. In some embodiments of the device, the distal end of the device may include a mechanism facilitating the advancement of the lickable treat formulation for dispensing to animals (e.g., a lever-based mechanism or a screw-type mechanism). In other preferred embodiments of the device, the distal end of the device may be comprised, or partially comprised, of materials that directly enable the manual advancement and dispensing of the lickable treat without using additional advancement mechanisms (e.g., the storage compartment housing the lickable treat may comprise or partially comprise a flexible material that may be squeezed or otherwise manipulated to advance and dispense a lickable treat housed therein). In some embodiments, the storage compartment housing the lickable treat may comprise multiple layers, one or more of which may comprise or partially comprise a flexible material that may be manipulated to advance and dispense the lickable treat. In some preferred embodiments of the device, the materials comprising the housing for the lickable treat may include thermally insulating materials that may be used to help keep the enclosed treat either warmer or cooler than the ambient temperature.

In some embodiments, the proximal and distal ends of the device may comprise a single component. In such embodiments, both the compartment in which the lickable treat is housed and the semi-removable dispensing component through which the lickable treat is dispensed may be included as part of a single component. In other embodiments, the device may comprise two or more separate components that may be securely and releasably connected. In some such embodiments, the distal component housing the lickable treat may be directly affixed to the proximal component including the semi-removable dispensing mechanism. In other such embodiments, the distal component housing the lickable treat may be indirectly affixed to the proximal component via one or more auxiliary components used to help secure the distal and proximal components of the device. The mechanisms used to either directly or indirectly affix the proximal component and the distal component of the device may include mechanisms that may enable the components to be slid together, threaded augers, which may be screwed together, snap-shut doors or latches, clips, magnets, buckle-style mechanisms, or other structures used to securely and releasably affix the components.

In some embodiments of the device, one or more additional features or components may be affixed or integrated into the proximal or distal components of the device. These additional attributes may serve to facilitate or enhance the efficacy, functionality, ease of use, or otherwise increase the general attractiveness or desirability of the device in a variety of ways. In some embodiments of the device, a loop, hole, handle, strap, or any type of similar structure may be integrated or otherwise affixed or attached to the proximal or distal end of the device. These structures may vary greatly in size, nature, and placement. Some embodiments of the device may include a loop originating from the distal end of the device that may be large enough for users to slip over their wrists. Some embodiments of the device may include loop- or hole-style structures that are comparatively small or inobtrusive (e.g., a tab with a hole 0.25" in diameter located at the distal end of the device). Some embodiments of the device may include loop- or hole-style structures such as a strap extending from the proximal to the distal end of the device that may help a user keep the device secure in the palm of their hand without having to actively grasp the device with their fingers. Potential embodiments of the device may include two or more of these types of structures.

In some embodiments of the device, the distal end of the device may include an opening that can be intermittently unsealed and sealed. The ability to intermittently seal and unseal the distal end of the device may help facilitate ease of use or otherwise be desirable for various reasons, for example, by offering another opening through which to fill the body of the device with an edible treat and/or by facilitating the ease with which the device may be cleaned. Potential mechanisms that may be used to intermittently seal and unseal the distal end of the device include, but are not limited to, "zipper", "fly", or "zip fly" mechanisms or "clasp lockers", "zippie" or "slider" mechanisms, hook-and-loop fasteners, magnetic mechanisms, slidable rigid fixtures, and mechanisms in which open ends are rolled or 'dog-eared to create a tight seal (sometimes called 'dry bag' mechanisms).

In some embodiments of the device, the proximal or distal end of the device may be modified to enable small items to be stored in or otherwise affixed to the training device. Potential features facilitating the storage or attachment of small items (e.g., household keys, waste bags, and other similar items) include netting, pockets, compartments, cavities, and other similar structures that may be incorporated or affixed to either the proximal or distal end of the device. Potential embodiments of the device may include any number of these types of storage-related structures, and these features may assume a wide variety of shapes and sizes. In some embodiments of the device, the proximal or distal components of the device may be modified to include an additional animal-related accessory, such as a small flashlight, a whistle, or a squeaker.

In some preferred embodiments of the device, one or more noisemaker components (e.g., a clicker device used to produce 'clicking' sounds that are frequently used as part of positive reinforcement training techniques) may be integrated into the device. The noisemaker may be incorporated into the device in a variety of ways. In some embodiments, the noisemaker can be made of a metal or other material capable of making a sound when moved. For example, the noisemaker may be compressed or pushed inward to cause a sound or the noisemaker may be moved such that when it is let go or released the noisemaker hits or comes into contact with another material to make a sound. In some embodiments, the noisemaker may have a bent shape such that when it is pushed and then released it automatically returns to its original positioning making a noise in the process. The noisemaker may include a button that actuates a pre-recorded sound when pushed. The noisemaker may have a curved surface that makes a noise when pushed inward. The noisemaker may include two or more pieces of material that come into contact when actuated to produce a sound. Some potential embodiments incorporating noisemaker components may include a noisemaker directly housed in the proximal component encompassing the semi-removable dispensing mechanism, a noisemaker housed in an auxiliary component used to affix the distal and proximal components of the device, or a noisemaker integrated into the distal component of the device. One preferred embodiment of the device may include the integration of the clicker in the proximal end of the device, thus facilitating the ease with which the user may use the clicker component in their training techniques.

Some potential embodiments of the device may include two or more bodies in which to house lickable treats, which may be dispensed via one or more semi-removable dispensing mechanisms. In some embodiments, the lickable treats may be housed in multiple separate compartments and dispensed from a single semi-removable dispensing mechanism. In some embodiments, the device may include multiple separate compartments in which the lickable treats are housed and may include multiple semi-removable mechanisms from which these lickable treats may be dispensed. In some embodiments, the device may include two or more semi-removable dispensing mechanisms from which to dispense lickable treats from the proximal end of the device. In other embodiments, the device may comprise two devices with the distal ends affixed to one another. The devices can be the same or different. In some embodiments, the devices described herein may be 'dual-ended' devices and, for example, include semi-removable dispensing mechanisms located at both the proximal and the distal end of the device. In some embodiments, the dual-ended device can comprise a housing with two or more individual chambers. The chambers can be separated by a separator. Each individual chamber can be fluidly coupled to a corresponding dispensing mechanism. One or more of the chambers can include a clicker device. The clicker devices may have distinct sounds to uniquely identify the treat stored in each chamber.

The device described in this disclosure may assume any number of physical dimensions. A preferred embodiment of the device may include space in which to house between 0.25 and 10 oz of the lickable treat, but other embodiments of the device may entail alternative volumetric capacity. Some preferred embodiments of the device may range from 0.5" to 12" in length, 0.5" to 6" in depth, and 0.5" to 6" in depth, but other embodiments may include alternative dimensions. Various embodiments of the device may assume any number of shapes. Some preferred embodiments of the device may generally assume a cylindrical shape. In some preferred embodiments of the device, the width of the device may exceed the depth of the device or the depth of the device may exceed the width of the device, generally giving the device a 'flat' shape. In general, preferred embodiments of the device will likely include dimensions and shapes that can be easily stored, transported, and used. Flat embodiments of the device, housing between 0.5 and 3 oz may be among the more preferred embodiments of the device, as such dimensions may enable users to easily store the device in pockets and comfortably fit the device in a single hand.

Figure 2:
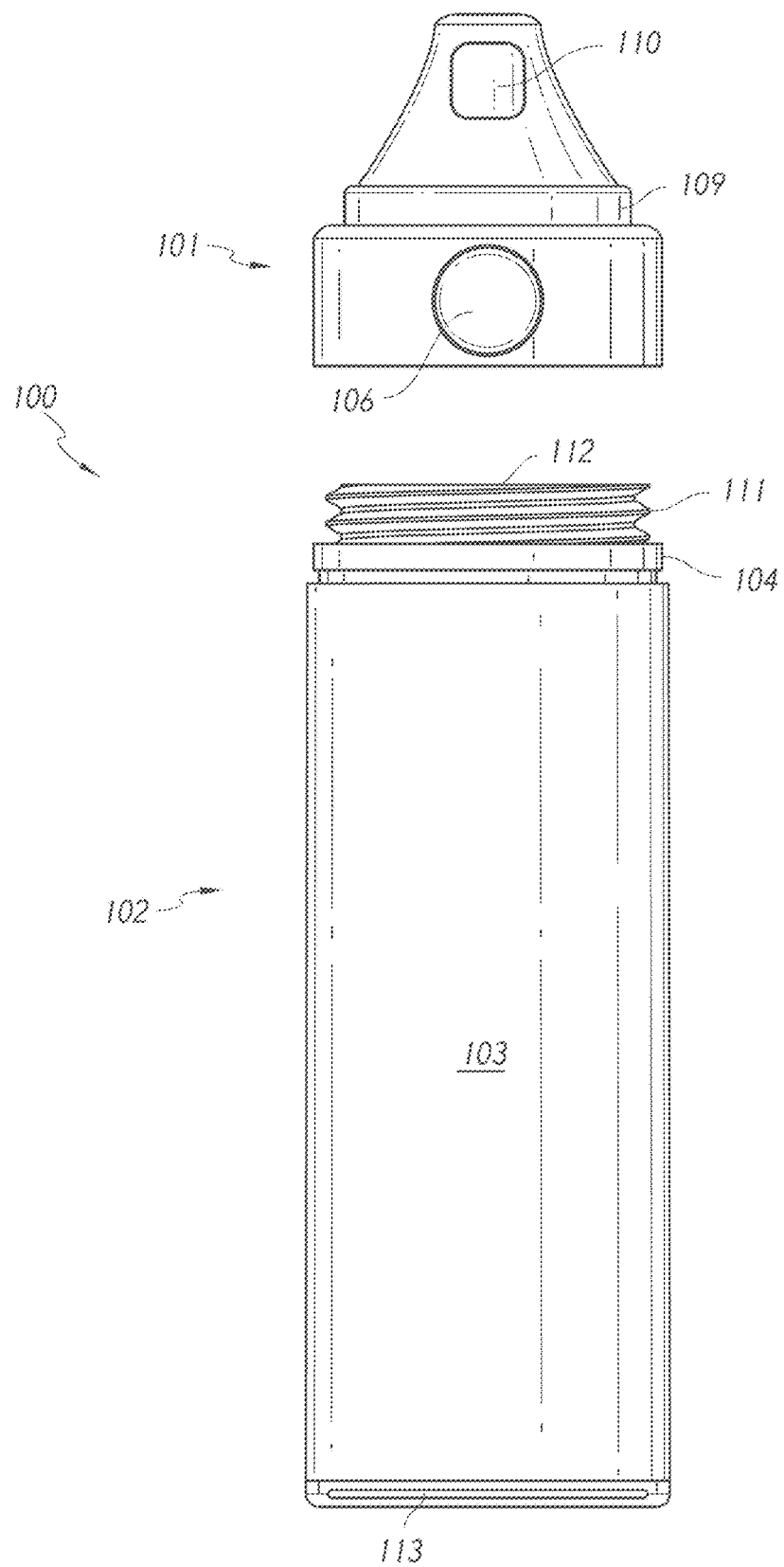
FIG. 2 illustrates an exploded front view of the animal treat dispensing device of FIG. 1.

Example Embodiments of the Animal Treat Dispenser and Training Device for Controllable Delivery of Lickable Treat FIG. 1 illustrates a side-perspective view of an animal treat dispensing device 100 according to the present disclosure. In some embodiments, the device 100 can be a pet reward and training device. In some embodiments, the device 100 can be both an animal treat dispensing device and a pet reward and training device. Device 100 can include a proximal component 101 and a distal component 102. The proximal component 101 and the distal component 102 can be removable from each other. The proximal component 101 may be a semi-removable dispensing mechanism as described herein. In some instances, the proximal component 101 may be a cap. The distal component 102 may be a housing or compartment for storing a pliable or semi-sold treat. For example, treats that are gels, pastes, creams, or other lickable treats that are pliable in nature. FIG. 1 provides a view of the device 100 in which the proximal component 101 and distal component 102 of the device 100 are securely interlocked or coupled together. The proximal component 101 and the distal component 102 can be disconnected, for example, as shown in FIG. 2.

The distal component 102 comprises a flexible or partially flexible housing 103 in which a lickable treat may be stored and from which a lickable treat may be extruded into the proximal component 101, from which the lickable treat may be dispensed. The flexible nature of the housing 103 in which the treat is stored and from which it is extruded to be dispensed allows the user to have control over the dispensing of semi-solid edible treats, as the user can change the rate of flow by, e.g., reducing the amount of pressure exerted on the housing 103 in order to lessen the treat flow or increasing the amount of pressure exerted on the housing 103 in order to increase the treat flow. The flexible or partially flexible housing 103 of the distal component 102 may be made of any material, including, for example, plastic or plastic polymers, aluminum, or silicone. The appearance of the flexible housing may take any form, including solid or opaque layers, transparent layers, graphic designs or pictures, or other visual appearances not specified here. In some embodiments, the flexible or partially flexible housing 103 may be made of a combination of materials or may be made of more than one layer of different types of materials. In some embodiments of the device, the flexible or partially flexible housing 103 may comprise or essentially consist of a material that provides some level of thermal insulation that may be used to help regulate the temperature of the edible treat enclosed therein. The distal component 102 in which the treat is housed may include additional features that are desirable for users or facilitate ease of use. Such additional features may potentially be affixed to the flexible housing 103, but they may be incorporated into the distal component 102 of the device in a variety of ways.

The distal component 102 shown in FIG. 1 includes an opening 112 (shown in FIG. 2) through which semi-solid or pliable treats can freely move. When the proximal and distal components of the device are disconnected, this opening in the distal component 102 can be used as a means by which to load the flexible treat compartment 103 with pliable treats. When the proximal and distal components of the device are securely connected, the opening serves as a pathway through which the lickable treat housed in the flexible body 103 can be extruded into the proximal component 101 and dispensed. In device 100, the opening is surrounded by a rigid circumference at the end 104 of the distal component 102 to which the flexible housing 103 is securely attached. In some embodiments, the rigid proximal end 104 of the distal component 102 is directly molded around the flexible housing 103 of the distal component 102, thus securely and permanently attaching the flexible housing 103 and the rigid proximal end 104. This rigid proximal end 104 of the distal component 102 provides a means by which to securely and releasably affix the distal component 102 in which the edible treat is housed and the proximal component 101 through which the treat is dispensed (note: the proximal component 101 through which the treat is dispensed may generally be referenced 'the endcap'). In the embodiment of the device illustrated in FIG. 1, the endcap 101 is securely affixed to the rigid proximal end 104 of the distal component 102 via threading located on the interior of the distal portion of the endcap 101 (not visible) and threading 111 located on the exterior of the rigid proximal end 104 of the distal component 102 that can be screwed together to securely and releasably engage the proximal component 101 and the distal component 102 of the device. In other embodiments of the device 100, the endcap 101 may be affixed to the end 104 of the distal component 102 of the device via a number of other structures and mechanisms, such as magnets, buckle-style or press-release mechanisms, snap-fit components, or other structures or mechanisms (or combinations thereof) not specified here.

In some embodiments, the endcap 101 of the device 100 can include a clicker device 106 that may be directly integrated into the design of the endcap 101. In some embodiments of the device 100, the location where the clicker device 106 is located may include other types of noisemakers (e.g., a squeaker) that may be used to attract and retain a pet's attention, other pet-related features, or storage compartments; some embodiments of the device may include no such features. The endcap 101 includes an opening 107 through which the lickable edible treat may be extruded from the device 100 and dispensed to an animal by squeezing, rolling, or otherwise manipulating the flexible body 103 in which the treat is housed. In some embodiments, the opening 107 may be sealed or unsealed (or opened and shut, revealed and covered, exposed and concealed, etc.) by a lid 109 that is connected to the endcap 101 via a hinge 108. In some embodiments, the opening 107, a lid 109, and a hinge 108 may form a semi-removable dispensing mechanism 105. The semi-removable dispensing mechanism may be a 'flip-top cap' or a 'flip-top lid'. In some embodiments, the flip-top cap design is somewhat elongated, with the opening 107 through which the edible treat is dispensed extending in a conical shape and the lid 109 shaped to accommodate the elongated nature of the opening 107. Different embodiments of the device in which the semi-removable dispensing mechanism 105 is a flip-top cap, or some variation thereof, may take a variety of shapes and sizes.

FIG. 2 illustrates an exploded front-perspective view of the first example pet reward and training device 100. This view of example device 100 illustrates features of this particular embodiment of the device that may not be visible in FIG. 1. The endcap 101 depicted in FIG. 2 is closed, revealing an aspect of the lid 109 that was not visible in FIG. 1. In some embodiments, the lid 109 of the semi-removable dispensing mechanism 105 includes an indent or recessed area 110 that may be used to help facilitate the ease with which the flip-top cap mechanism is operated. Given the elongated shape of the particular flip-top lid mechanism depicted in FIG. 1 and FIG. 2, this indent or recessed area 110 may be particularly helpful in providing traction for, e.g., a thumb used to flip open the cap, thus supporting single-handed use of the device.

FIG. 2 illustrates the location of opening 112 at the proximal end of the distal component through which the pliable treat may be loaded or filled into the distal component 102 of the device. This opening 112 was referenced in the description of FIG. 1 but was not visible in the side perspective of the device in which the proximal component 101 and the distal component 102 of the device were securely connected. FIG. 2 also illustrates the threading 111 in the rigid proximal end 104 of the distal component 102 that was similarly referenced in the description of FIG. 1 but was not visible in that perspective. In some embodiments, threading 111 may be used in conjunction with threading located inside the interior of the proximal component 101, thus ensuring a secure, air-tight fit, and releasable connection between the proximal component 101 and distal component 102 of the device. Once the proximal and distal components of the device are connected, the opening 112 can provide a pathway through which the pliable treat can be advanced from the flexible housing 103 to the opening 107 through which it is dispensed to a pet.

Figure 3:
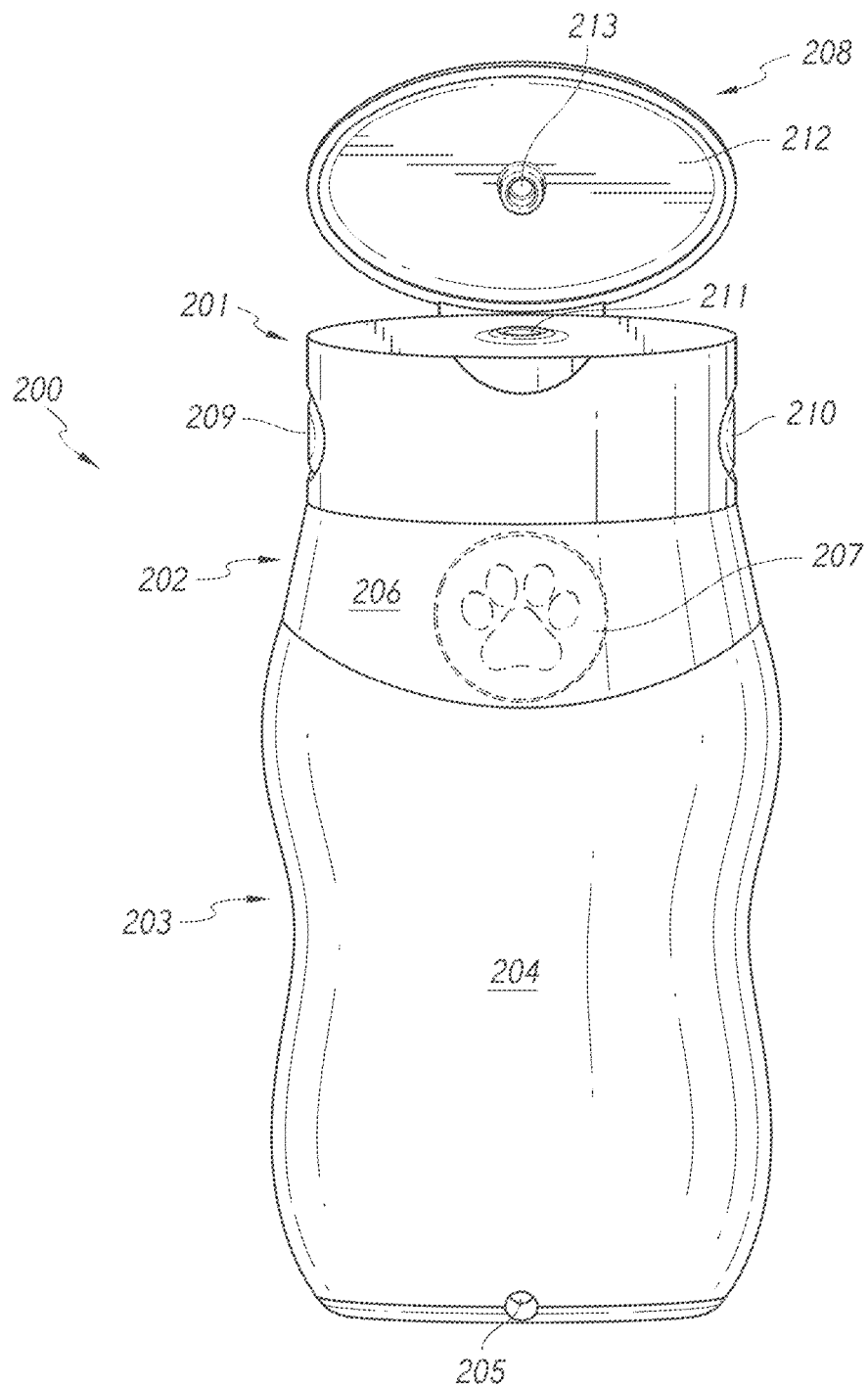
FIG. 3 illustrates a front view of another example embodiment of an animal treat dispensing device.

FIG. 3 provides a front view of a second example embodiment of an animal treat dispensing device 200 according to the present disclosure. In some embodiments, the device 200 can be a pet reward and training device. In some embodiments, the device 200 can be both an animal treat dispensing device and a pet reward and training device. The device 200 can include a proximal component 201, a distal component 203, and an auxiliary component 202. The auxiliary component 202 can help attach or couple the proximal component 201 and distal component 203 together. The proximal component 201 can be a semi-removable dispensing mechanism as described herein. In some instances, the proximal component 201 may be a cap. The distal component 203 may be a housing or compartment for storing a pliable or semi-solid treat. The distal component 203 can comprise a flexible, semi-flexible, or partially flexible body 204 in which a lickable treat (e.g., a semi-solid or pliable treat) may be stored and from which the lickable treat may be extruded and dispensed to a pet. Similar to the flexible material 103 in example device 100, the flexible material comprising the flexible body 204 in example device 200 may include thermally insulating materials or layers and may contain some number of layers. In some embodiments, the flexible housing 204 includes a hole or opening 205 extending through the flexible material (i.e., insulated from the edible treat stored in the flexible material 204) from the front of the device to the back of the device. The insulation between hole 205 and the edible treat housed in flexible housing 204 may be made of a number of materials or combinations thereof. For example, it may comprise the flexible material of the flexible body 204 or it may comprise a more rigid material (e.g., a plastic or a polymer). Holes or openings such as opening 205 may assume any number of shapes and sizes and may be made of any number of materials in different embodiments of the device. The hole or opening 205 may be used to connect the device 200 to a keychain, lanyard, or other accessory.

In some embodiments, the distal component 203 and the auxiliary component 202 can be an integrated or unitary structure. The unitary structure can include a flexible portion corresponding to the distal component 203 and a rigid portion corresponding to the auxiliary component 202. The flexible portion can be molded over or otherwise permanently attached to the rigid portion to form the integrated or unitary structure. In some embodiments, the flexible portion may comprise silicone.

In some embodiments, the auxiliary component 202 can be used to help affix, attach, or couple the flexible housing 204 to the proximal component 201. In some embodiments, the auxiliary component 202 may be a shell that can be slipped over a lip at the opening of the flexible housing 204, for example as shown in FIG. 5. In some embodiments, the auxiliary component 202 may comprise a rigid or semi-rigid material 206 and include an opening 207 for a clicker device. In example device 200, the auxiliary component 202 may be affixed to the proximal component of the proximal component 201 via two 'press-button' or 'buckle-style' structures 215 that extend through the holes 209 and 210 on either side of proximal component 201. The semi-removable dispensing mechanism 208 of this device, which may generally be described as a 'flip-top lid' or a 'flip-top cap', may include an opening 211 through which the lickable treat is dispensed from the device 200, a top lid 212, and a stopper 213 that may be used to plug opening 211 when the lid 212 is closed. The semi-removable dispensing mechanism 208 may also include a hinge 214, shown in FIGS. 4 and 5.

Figure 4:
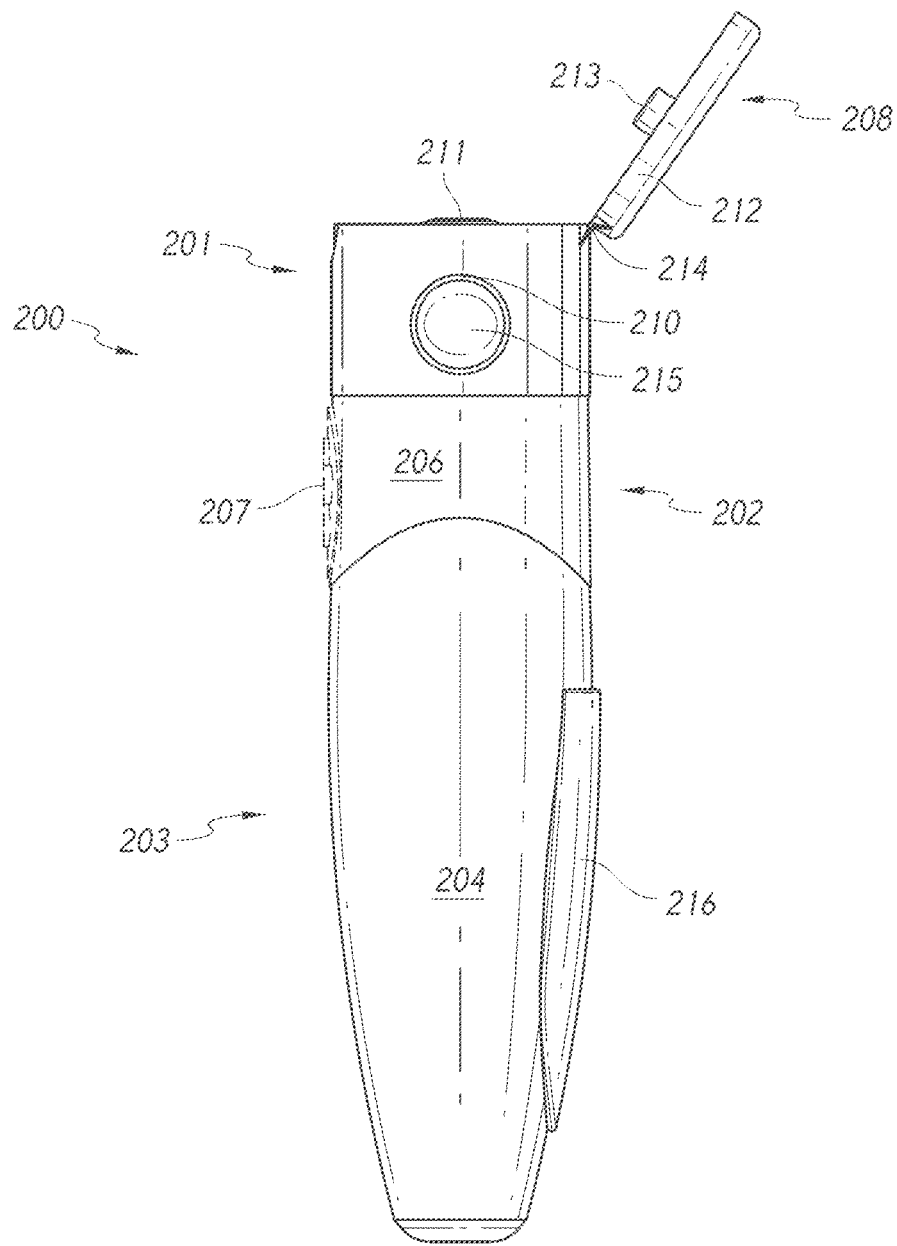
FIG. 4 illustrates a side view of the animal treat dispensing device of FIG. 3.
Figure 5:
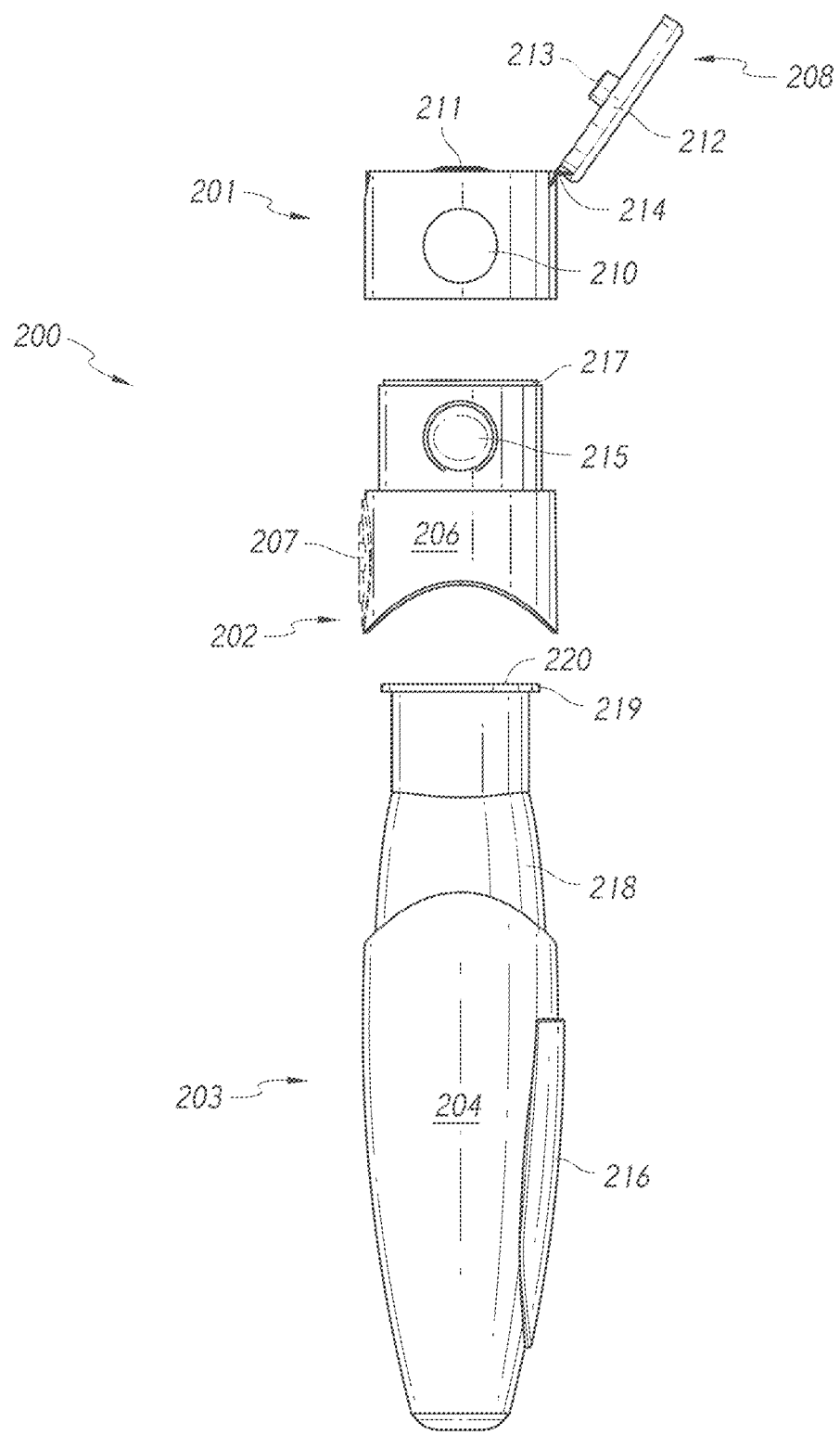
FIG. 5 illustrates an exploded side view of the animal treat dispensing device of FIG. 3.

FIG. 4 provides a side-perspective view of the device 200. This view of example device 200 illustrates features of this particular embodiment of the device that may not be visible in FIG. 3. In particular, the side-perspective view illustrates the 'press-button' or 'buckle-style' structures 215 of auxiliary component 202. This particular view of the device illustrates a single buckle-style structure 215 of the auxiliary component 202 that is secured (what may be colloquially described as 'clipped in' or 'buckled in') to the opening 210 in the proximal component 201 of the device. In device 200, a similar buckle-style structure may be found on the other side of the device (not visible in this view). In some embodiments, the auxiliary component 202 may be slipped around the neck of the flexible body 204 and used to affix the distal component 203 of the device 200 to the proximal component 201 of the device 200 by pressing the two components together. The auxiliary component 202 and flexible body 204 of the device 200 may be disconnected from the proximal component 201 of the device 200 by pressing the buckle-style structures 215 in from the outside of the device, thus releasing the buckle-style mechanism.

FIG. 4 provides a view of the hinge 214 connecting the top lid 212 of the device 200 to the main proximal component 201 of the device. In some embodiments, the semi-removable dispensing mechanism of the device can primarily comprise the opening 211 through which the lickable treat is dispensed, the top lid 212 and the stopper structure 213 used to seal the opening 211 when closed, and the hinge 214. In example device 200, the opening 211 is surrounded by a small rim, but the opening may take different forms in other embodiments of the device (e.g., the opening may be flush against the top of the cap, without any surrounding rim). FIG. 4 also illustrates additional features that may be included as part of the device. For example, the flexible body 204 may include a flexible pocket structure 216 on the back of the device that may be used for storage (e.g., storage of waste bags or keys).

FIG. 5 provides an exploded side-perspective view of the device 200. This view of the device offers a view of the proximal component 201, the distal component 203, and the auxiliary component 202 used to help affix the flexible housing 204 of the distal component 203 to the proximal component 201. The proximal component 201 shows the openings 210 by which the 'buckle-style' structures 215 of the auxiliary component 202 are secured. As seen in FIG. 5, the flexible body 204 of the distal component 203 includes a relatively long and thin neck 218 that culminates in a flexible rim 219 with a greater circumference. Though not visible in this image, the flexible rim 219 encircles an opening 220 by which the flexible housing may be loaded with a lickable treat and through which the treat moves as it is extruded from the flexible housing 204 into the proximal component 201 of the device 200 and dispensed through the opening 211. In some embodiments, the flexible rim 219 of the distal component 203, is slipped over the rigid rim of the auxiliary component 217 to generally position the auxiliary component 202 around the flexible body 204. The flexible rim 219 may serve as a gasket when the auxiliary component 202 is secured to the proximal component 201 of the device 200 and can help ensure an air-tight fit between the two components.

Figure 6:
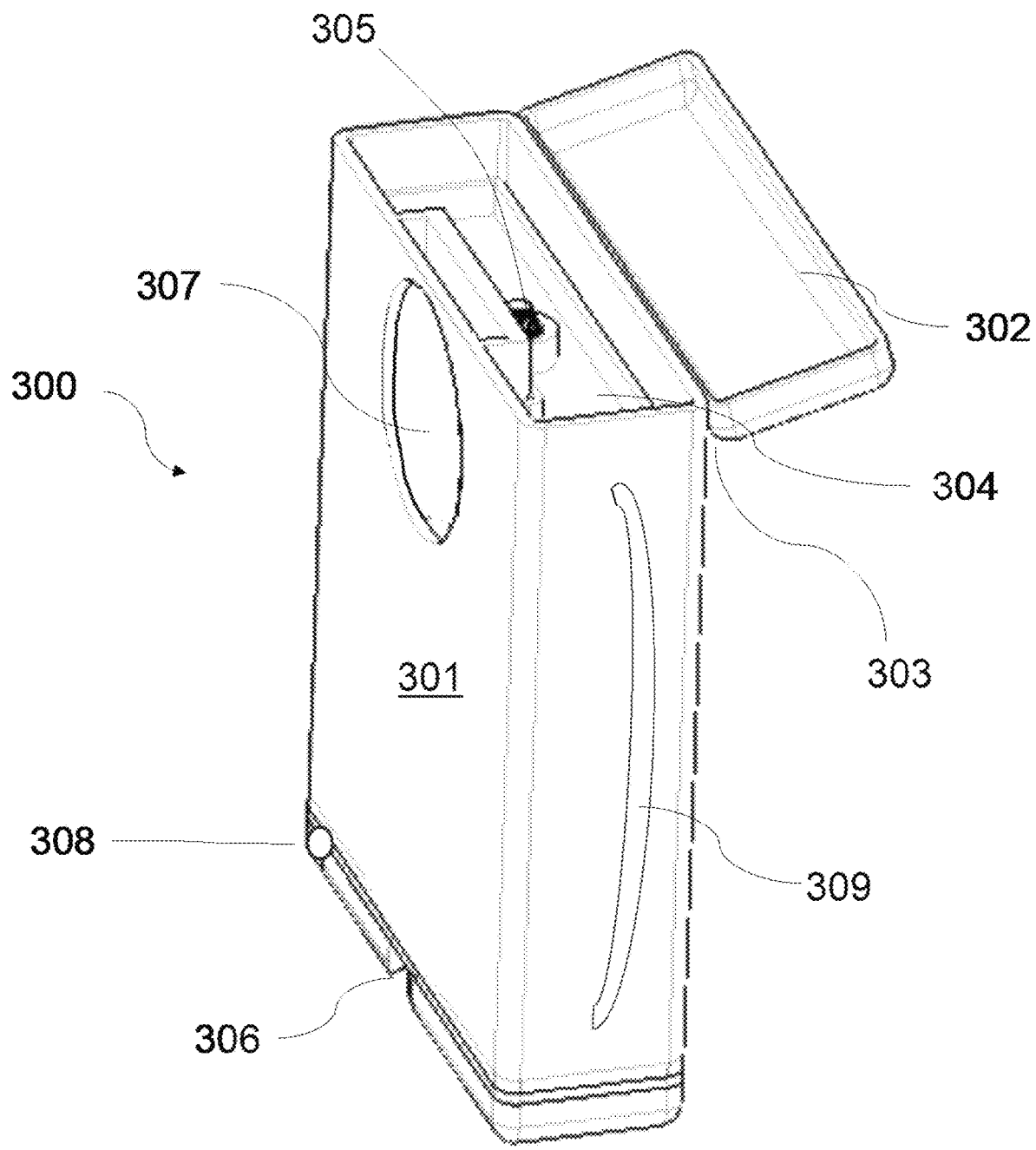
FIG. 6 illustrates a perspective of another example embodiment of an animal treat dispensing device.

FIG. 6 provides an angled perspective of a third example embodiment of an animal treat dispensing device 300. In some embodiments, the device 300 can be a pet reward and training device. In some embodiments, the device 300 can be both an animal treat dispensing device and a pet reward and training device. In some embodiments, the main body of the device largely consists of a rigid body 301 in which the lickable edible treat can be stored. This housing 301 for the edible treat may be made up of any variety of materials and may include multiple layers or a combination of different materials. In this device 300, the edible treat may be advanced from the storage compartment 301 to be dispensed to a pet by a mechanism embedded in the treat storage compartment 301. In some embodiments, the treat advancement mechanism includes a threaded auger 305, a basket 304 in or on which the treat may be located and through which the threaded auger 305 extends, and a structure or actuator 306 which may be manipulated to rotate the auger 305 and advance the basket 304. In some embodiments of the device, the basket 304 may be designed so as to sit flush against the inner walls of the treat housing 301 in order to enable less-viscous treats to be advanced through the device. Other embodiments of the device may include, for example, a single, solid, lickable treat that may be balanced on the basket 304 and advanced through the treat storage compartment 301.

The proximal end of this device includes a semi-removable dispensing mechanism that may be generally described as a flip-top cap or a flip-top lid. In some embodiments, a lid 302 is attached to the main body 301 of the device 300 via hinge 303. The flip-top cap mechanism can enable the user to open the cap with a single hand. In some embodiments, the opening that can be sealed and resealed by the flip-top cap mechanism can comprise the entire proximal end of the treat compartment 301. Other embodiments of the device may include other types of semi-removable treat dispensing mechanisms that may expose varying amounts of the lickable treat.

In some embodiments, a clicker device 307 can be embedded in an outer surface of the device 300, for example, the front, sides, or back surfaces. In other embodiments of the device 300, a storage compartment can be accessible from an outer surface of the device 300, for example as a storage compartment for waste bags or keys. The clicker device 307 and/or the storage compartment are optional features. In some embodiments, the device 300 can include a hole 308, which may be used, for example, to attach the device 300 to a waistband, a leash, a keychain, a retractable device, or other items. In some embodiments, the device 300 can include a strap 309 extending from an outer surface of the device, which may be wrapped around the user's hand to facilitate ease of storage and ease of use. In various embodiments of the device, a strap such as strap 309, or other such structures, may also be used to affix the device to other items (e.g., a leash), and may include mechanisms by which the length of the strap or other structure may be modified.

In example device 300, the width of the body 301 is significantly greater than its depth (i.e., the front view is wider than the side view); other embodiments may have different ratios between the two dimensions. This example device is relatively flat and wide; this may be a preferred embodiment for users who desire a treat-dispensing device that can be sleekly and discreetly stored (e.g., in a pocket). Other embodiments of the device may include different dimensions and different shapes (e.g., a cylindrical device similar in shape to a typical lip balm tube, among other potential embodiments).

Figure 7:
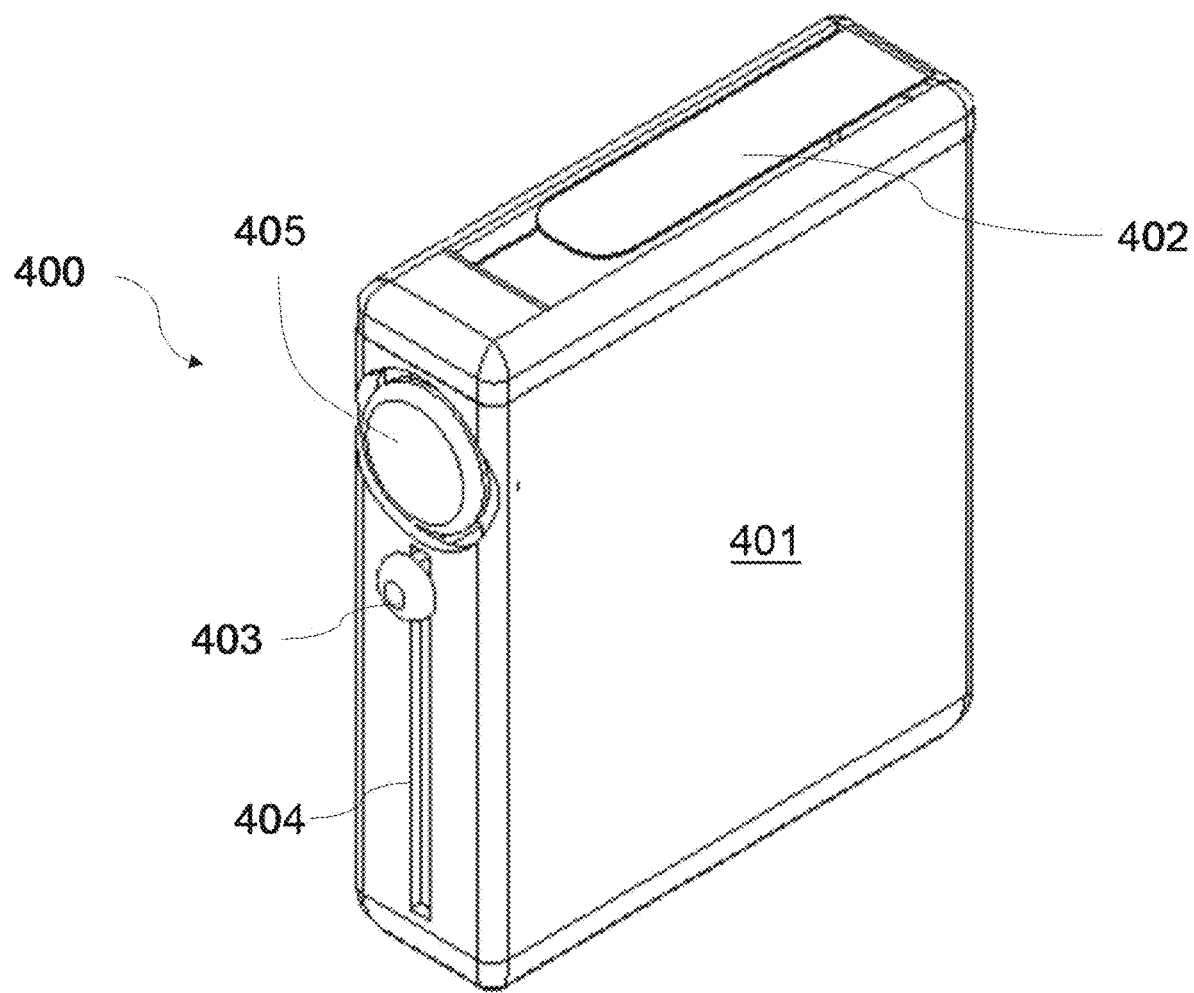
FIG. 7 illustrates a perspective of another example embodiment of an animal treat dispensing device

FIG. 7 provides an angled perspective of another example device 400. In some embodiments, the device 400 can be an animal treat dispensing device 400. In some embodiments, the device 400 can be a pet reward and training device. In some embodiments, the device 400 can be both an animal treat dispensing device and a pet reward and training device In this particular embodiment of the device, the main body of the device can include a rigid body 401 in which the lickable edible treat may be stored. In some embodiments, the edible treat may be advanced from the storage compartment 401 to be dispensed to a pet by utilizing a lever mechanism 403 that can be manipulated through a vertical opening 404 in the device 400. In some embodiments, the lever component 403 may be only one part of the overall lever mechanism. In many potential embodiments, lever-style treat advancement mechanisms may include additional parts that are not visible in FIG. 7. Different embodiments of the device may include treat advancement mechanisms that use different types of manipulation in order to advance the treats. For example, in some devices that include lever-type mechanisms, users may push the lever up towards the top of the device to advance the treat and/or users may pull the lever down towards the bottom of the device to advance the treat. In some cases, such as where a device includes advancements via threaded augers, the user may rotate the threaded auger to advance the lickable treat. In some embodiments, the semi-removable dispensing mechanism can include a retractable lid 402 that is connected to the lever component 403, enabling the user to open the retractable lid and advance the treat mechanism with a single hand. In other embodiments of the device, the semi-removable dispensing mechanism may take alternate forms, (e.g., a flip-top cap that may be opened either manually or automatically as part of the treat advancement mechanism).

In some embodiments, the device 400 may include a clicker 405.

Figure 8:
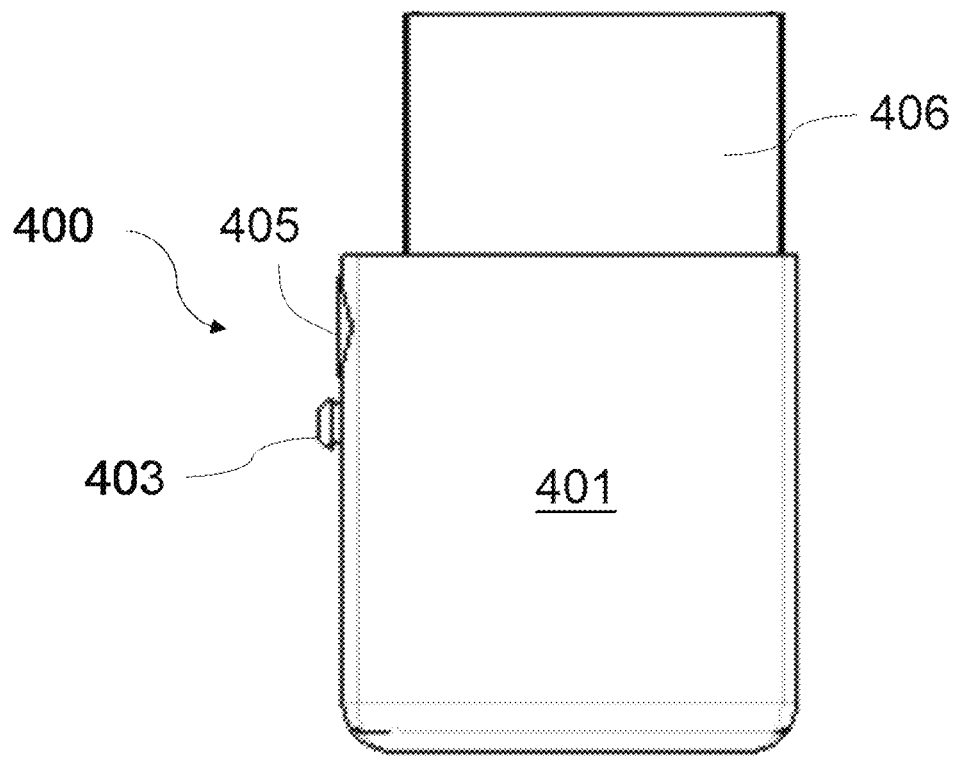
FIG. 8 illustrates a side view of the animal treat dispensing device of FIG. 7.
Figure 14:
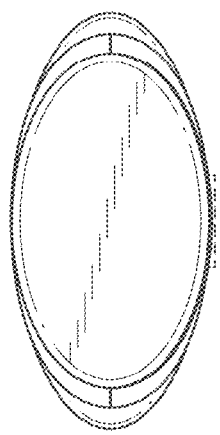
FIG. 14 illustrates a top view of the animal treat dispensing device of FIG. 9.
Figure 15:
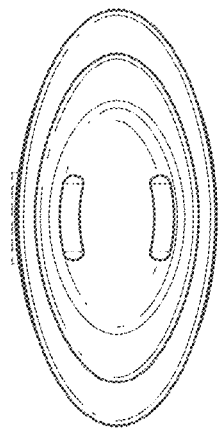
FIG. 15 illustrates a bottom view of the animal treat dispensing device of FIG. 9.
Figure 13:
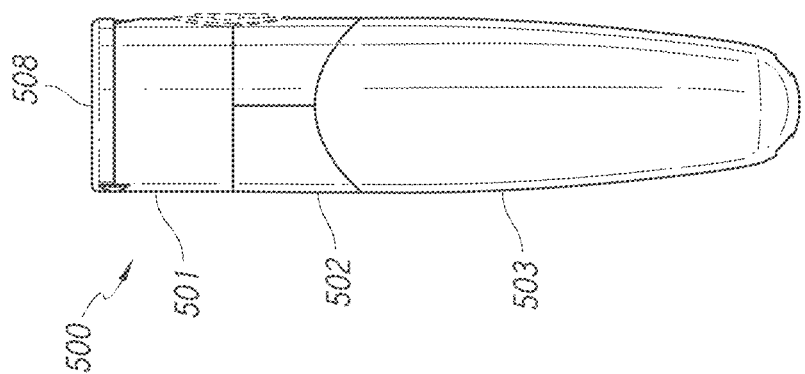
FIG. 13 illustrates a left-side view of the animal treat dispensing device of FIG. 9.
Figure 12:
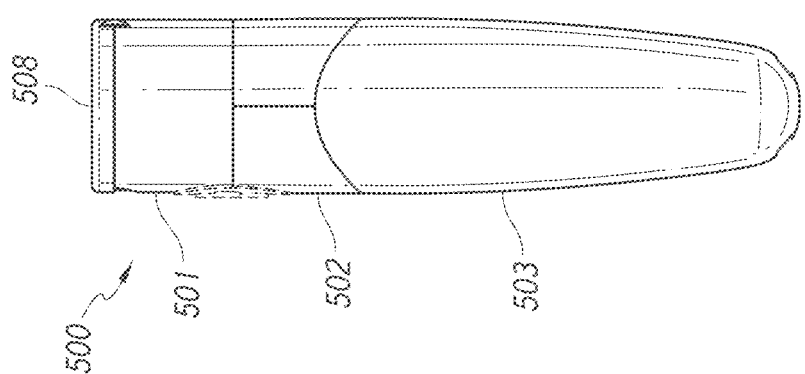
FIG. 12 illustrates a right-side view of the animal treat dispensing device of FIG. 9.

FIG. 8 illustrates a side profile view of the device 400, illustrating a potential extension of the lever mechanism 403 that may be used to advance and dispense the lickable treat. In some embodiments, the lever mechanism 403 may be used to advance a solid treat 406 out of the main treat storage body 401. Other embodiments of the device may include alternative lever mechanisms, for example, a telescoping mechanism that could be used to extend the treat far beyond the proximal end of the device, thereby extending the distance from which the lickable treat may be dispensed. Other embodiments of the device may include an assortment of modifications that may be used to enhance the form or function, the range or ease of use, or the general desirability, attractiveness, or value of the device.

FIGS. 9-17 illustrate another example embodiment of an animal treat dispensing device 500. In some embodiments, the device 500 can be a pet reward and training device. In some embodiments, the device 500 can be both an animal treat dispensing device and a pet reward and training device. Some of the features of the device 500 are similar to features of the device 200 in FIGS. 3-5. Therefore, the structure and description for the various features of the device 200 and how it's operated and controlled in FIGS. 3-5 are understood to also apply to the corresponding features of the device 500 in FIGS. 9-17 where appropriate. Though the features below are described in connection with the device 500, the features may also apply to the other devices, such as device 200 disclosed herein.

The device 500 may include a proximal component 501, an auxiliary component 502, and a distal component 503. The auxiliary component 502 may assist in securing the proximal component 501 to the distal component 503. In some embodiments, the auxiliary component 502 may be a collar. The proximal component 501 may be a semi-removable dispensing mechanism as described herein. In some instances, the proximal component 501 may be cap. In some embodiments, the cap can be a flip-top cap that can remain connected to the device 500 by a hinge 505 when in an open state. In some embodiments, the cap can be fully removed when in an open state.

In some embodiments, the distal component 503 and the auxiliary component 502 can be an integrated or unitary structure. The unitary structure can include a flexible portion corresponding to the distal component 503 and a rigid portion corresponding to the auxiliary component 502. The flexible portion can be molded over or otherwise permanently attached to the rigid portion to form the integrated or unitary structure. In some embodiments, the flexible portion may comprise silicone.

The proximal component 501 can include an opening 506 for dispensing a treat stored within the device 500. The proximal component 501 may include a stopper 507 to plug the opening 506 when the device is in a closed state. The stopper 507 can extend from a surface of a lid 508 of the proximal component 501. The lid 508 can be coupled to a base portion 509 of the proximal component 501. In some embodiments, the lid 508 can be connected to the base portion 509 via the hinge 505. The base portion 509 can be configured to couple the proximal component 501 to the auxiliary component 502. The base portion 509 can surround a portion of the auxiliary component 502 to secure the auxiliary component 502 to the proximal component 501. The proximal component 501 may have a generally flattened shape. The generally flattened shape may be beneficial in that it allows the device 500 to easily be stored within a user's pocket. The proximal component 501 may assist in maintaining the generally flattened shape of the distal component 503 and/or the auxiliary component 502.

Figure 17:
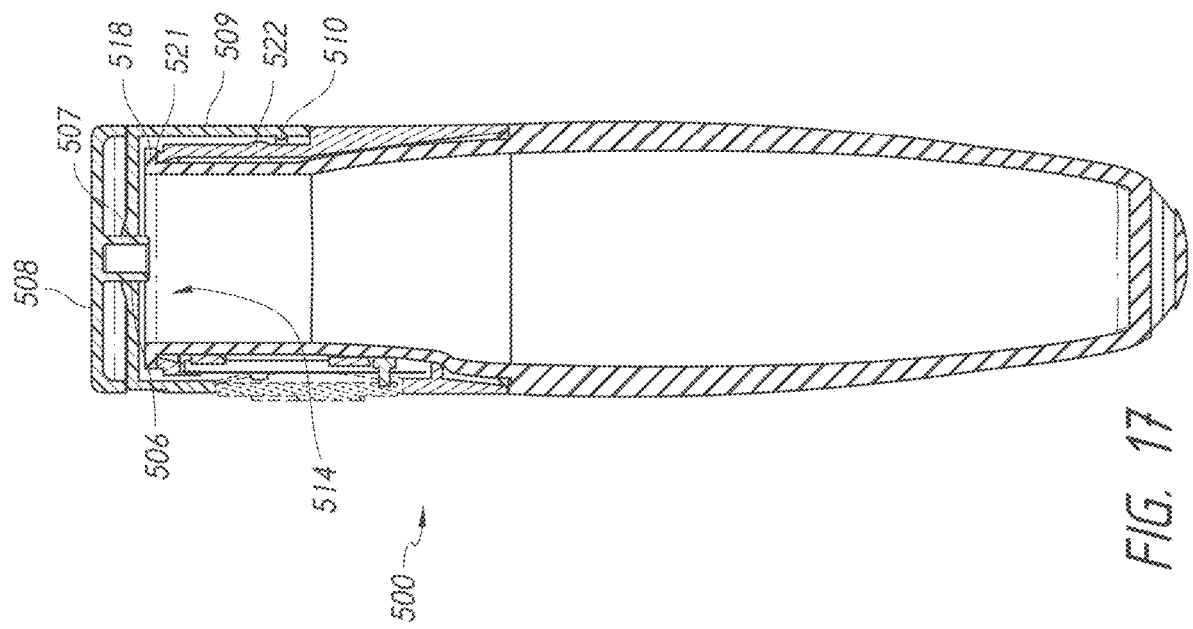
FIG. 17 illustrates a side cross-sectional view of the animal treat dispensing device of FIG. 9 taken along the line 17-17 as shown in FIG. 10.

The base portion 509 can include a protrusion 510 on an inner surface of the base portion 509, as shown in FIG. 17. In some embodiments, the protrusion 510 can be an annular protrusion 510. In some embodiments, the protrusion 510 can extend around an entire inner perimeter of the inner surface. In some embodiments, the protrusion 510 can extend around only a portion of the perimeter of the inner surface. In some embodiments, the inner surface can include more than one protrusion 510.

In some embodiments, the base portion 509 of the proximal component 501 can include a cut-out 511. In some embodiments, the cut-out 511 can have a half-circle shape or other shape that corresponds to the clicker 523. The cut-out 511 can be configured to at least partially surround a clicker as described in more detail below.

In some embodiments, the base portion 509 can include a depressed or recessed area 512. The depressed or recessed area 512 can enable a user to open the cap with a single hand. This can be beneficial as the user's other hand may be occupied with a dog leash or other item.

The distal component 503 may be a housing or compartment for storing a pliable or semi-solid treat. For example, the distal component can comprise a flexible, semi-flexible, or partially flexible body in which a lickable treat (e.g., a semi-solid or pliable treat) may be stored and from which the lickable treat may be extruded and dispensed to a pet. The flexible body may include a thermally insulating material or layers.

The distal component 503 may have a generally flattened shape. The generally flattened shape may be beneficial in that it allows the device 500 to easily be stored within a user's pocket. The auxiliary component 502 may assist in maintaining the generally flattened shape of the distal component 503. For example, the auxiliary component 502 may be generally oval shaped to assist in forming the generally flattened shape of the distal component 503. A generally flattened shape may have a width that exceeds a depth of the distal component 503. A generally flattened shape may have a height that exceeds a depth of the distal component 503. In some embodiments, a face or widest side of the distal component 503 can have a general arc convex shape from one lateral side to the other lateral side. In some embodiments, a portion (e.g., an activation region or area) of the face or widest side of the distal component 503 may not have an arc. The activation region or area may be arcless, flat or planar to facilitate pressing. The activation region or area may be a concave surface to facilitate pressing. The activation region or area may be a combination of an arcless, flat, planar, and concave surface. For example, the activation region or area may have an outer portion or ring that is flat while the inner portion or ring is concave. In some cases, the activation region or area of the distal component 503 may be recessed. For example, a circle or other shaped recess may be located in the center of the distal component 503. The recess may facilitate squeezing the distal component 503 to dispense the treat.

In some embodiments, the activation region may be centered relative to the lateral sides and/or centered on the face of the distal component 503. For example, moving from one lateral side to the other lateral side, the face of the distal component 503 may have an arced or convex shaped portion, a flat, planar, and/or concave portion, and an arced or convex shaped portion. Moving from a top side to a bottom side, the face of the distal component 503 may have an arced or convex shaped portion, a flat, planar, and/or concave portion, and an arced or convex shaped portion. In some embodiments, the face of the distal component 503 and the base of the distal component 503 may have the same curvature from lateral side to lateral side and/or from top to bottom. In some embodiments, the lateral sides of the distal component 503 may curve from the face of the distal component 503 to the bottom of the distal component 503. In some embodiments, the lateral sides of the distal component 503 may curve from the top of the distal component 503 to the bottom of the distal component 503.

In some embodiments, the distal component 503 may include a through hole or opening 513. The opening 513 may be positioned at an end of the device 500 opposite the proximal component 501. The opening 513 can be used to connect the device 500 to a keychain, lanyard, or other accessory.

Figure 16:
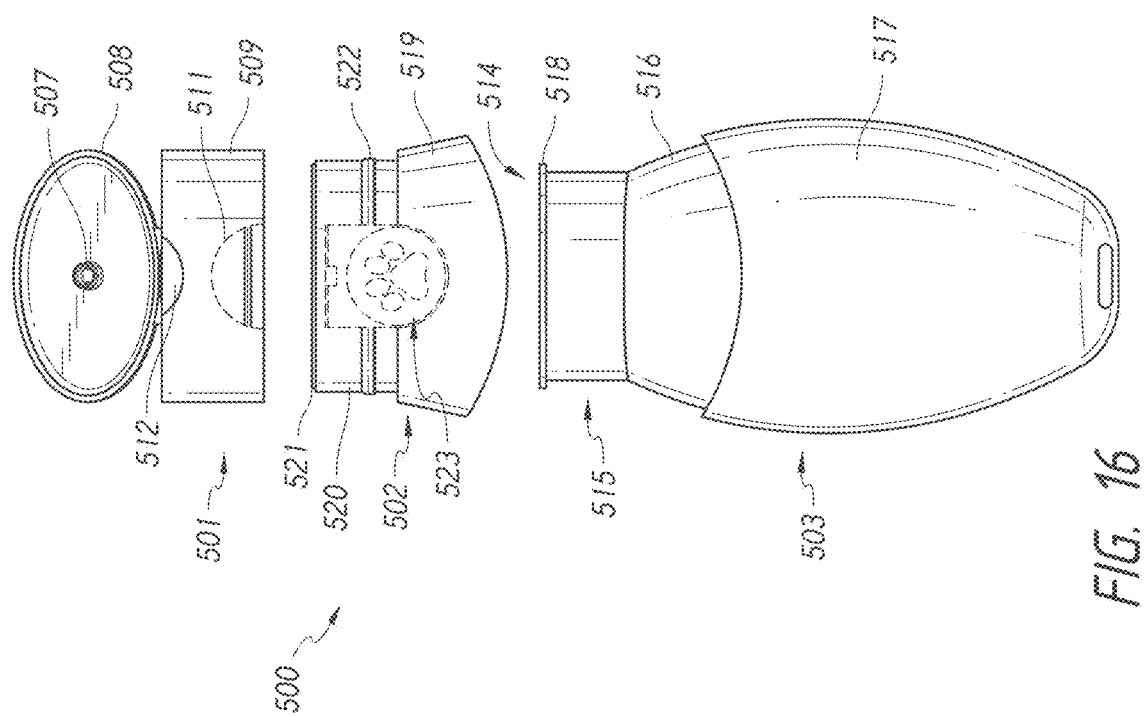
FIG. 16 illustrates an exploded view of the animal treat dispensing device of FIG. 9.
Figure 20:
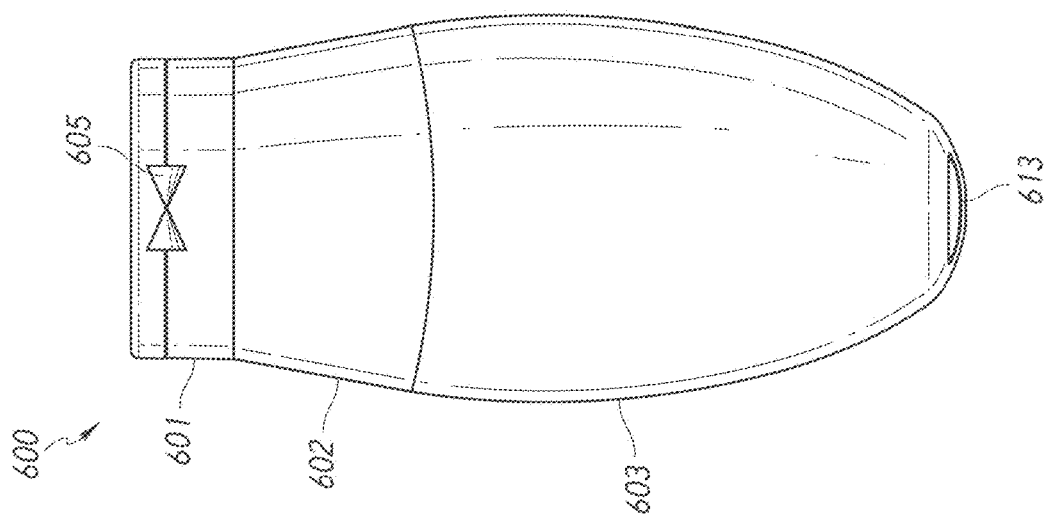
FIG. 20 illustrates a back view of the animal treat dispensing device of FIG. 18.
Figure 19:
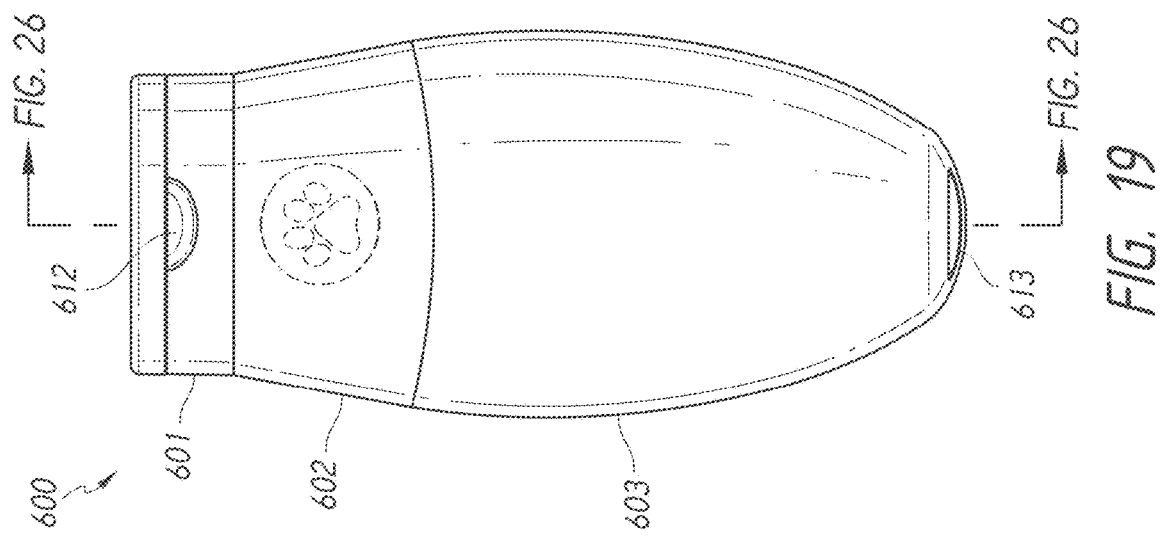
FIG. 19 illustrates a front view of the animal treat dispensing device of FIG. 18.
Figure 18:
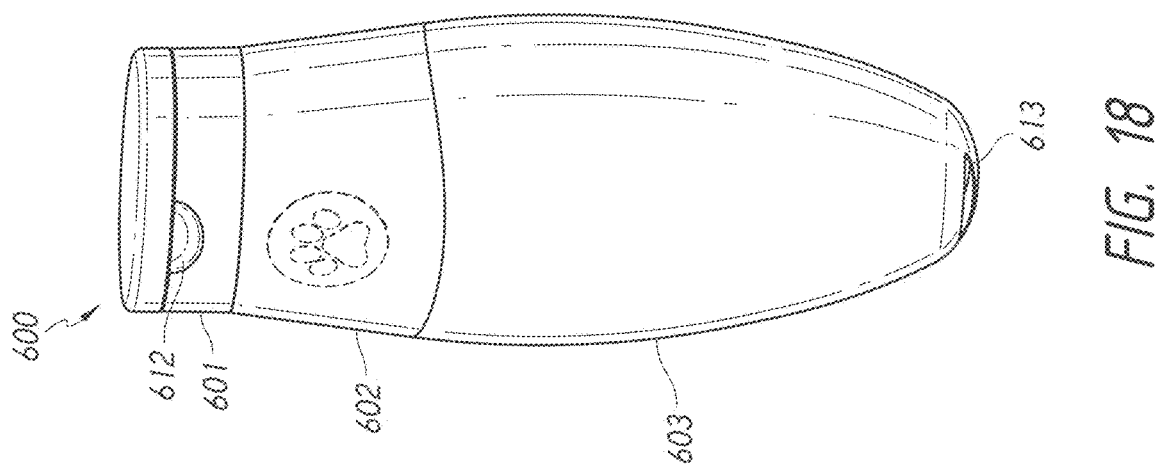
FIG. 18 illustrates a perspective view of another example embodiment of an animal treat dispensing device.
Figure 23:
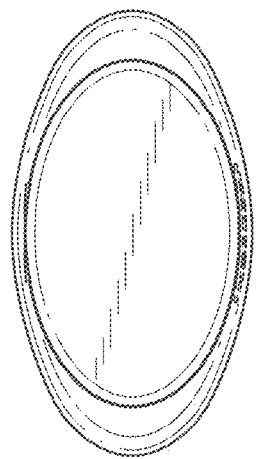
FIG. 23 illustrates a top view of the animal treat dispensing device of FIG. 18.
Figure 24:
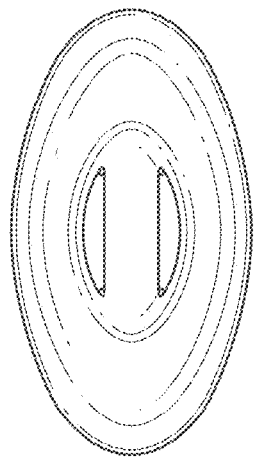
FIG. 24 illustrates a bottom view of the animal treat dispensing device of FIG. 18.
Figure 22:
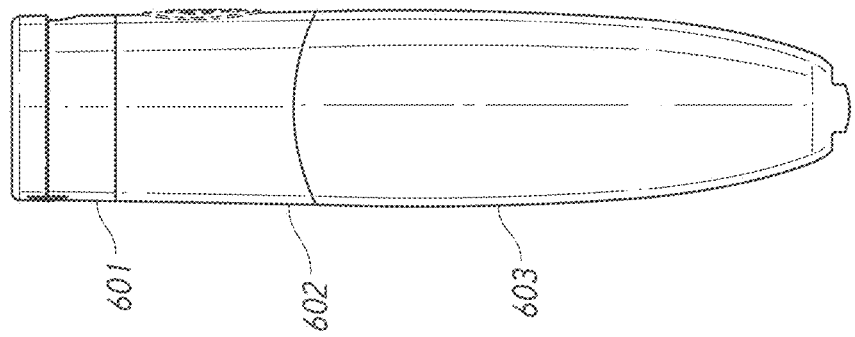
FIG. 22 illustrates a left-side view of the animal treat dispensing device of FIG. 18.
Figure 21:
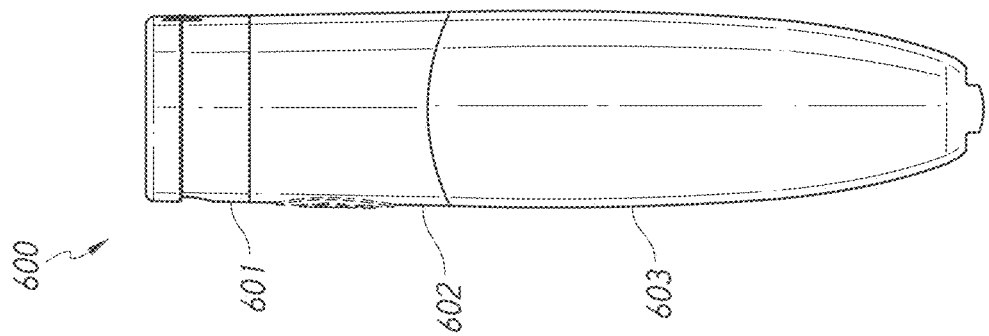
FIG. 21 illustrates a right-side view of the animal treat dispensing device of FIG. 18.

As shown in FIGS. 16 and 17, the distal component 503 can include a neck 515. The neck 515 can extend from an upper portion 516 of the distal component 503. The upper portion 516 can be recessed relative to a lower portion 517 of the distal component 503. The neck 515 can include a rim 518. The rim 518 can have a greater diameter than a diameter of the neck 515. In some embodiments, the rim 518 can be a flexible material. The rim 518 can encircle an opening 514. The opening 514 can be used for dispensing a treat stored within the housing. The rim 518 can assist in securing the auxiliary component 502 to the distal component 503 as described herein.

The auxiliary component 502 can include a lower portion 519 and an upper portion 520. The lower portion 519 can be configured to receive the neck 515 and the upper portion 516 of the distal component 503. When secured to the distal component 503, the lower portion 519 of the auxiliary component 502 can rest in the recessed area of the upper portion 516 of the distal component 503. An outer surface of the lower portion 519 of the auxiliary component 502 and an outer surface of the lower portion 517 of the distal component 503 can form a generally continuous appearing surface.

The auxiliary component 502 can include a ledge 521. The ledge 521 can extend around a perimeter of the upper portion 520 forming an opening. When the distal component 503 is inserted into the auxiliary component 502 through an opening in the lower portion 519 of the auxiliary component 502, the rim 518 of the distal component 503 can rest on the ledge 521. As the rim 518 of the distal component 503 is inserted through the auxiliary component 502, the rim 518 can compress or deform in order to fit through the auxiliary component 502. Once inserted through the auxiliary component 502, the rim 518 can expand to a diameter that exceeds the diameter of the ledge 521, such that the ledge 521 prevents the auxiliary component 502 from disengaging the distal component 503. The interaction between the rim 518 and the ledge 521 can assist in retaining the distal component 503 and the auxiliary component 502 together.

In some embodiments, the auxiliary component 502 can include a protrusion 522 extending from an outer surface of the upper portion 520. The protrusion 522 can be an annular protrusion 522. The protrusion 522 can extend around an entire perimeter of the outer surface of the upper portion 520. The protrusion 522 can extend around a portion of the perimeter of the outer surface of the upper portion 520. In some embodiments, the outer surface of the upper portion 520 can include more than one protrusion 522. The protrusion 522 can assist in securing the proximal component 501 to the auxiliary component 502. For example, as the proximal component 501 is applied to the auxiliary component 502, the protrusion 510 of the proximal component 501 can be advanced over the protrusion 522 of the auxiliary component 502. In some embodiments, the proximal component 501 may flex outward or slightly expand to allow the protrusion 510 to advance over the protrusion 522. In some embodiments, the auxiliary component 502 may slightly compress or flex to allow the protrusion 510 to advance over the protrusion 522. The proximal component 501 and/or the auxiliary component 502 may return to its original shape once the proximal component 501 and the auxiliary component 502 are coupled. The protrusions 510, 522 can assist in retaining the proximal component 501 and the auxiliary component 502 together. To separate the proximal component 501 from the auxiliary component 502 a user can apply a force in a direction along the longitudinal axis of the device 500. For example, a user can pull the proximal component 501 away from the auxiliary component 502 and/or a user can pull the auxiliary component 502 away from the proximal component 501. A user may also wiggle or move the proximal component 501 and/or the auxiliary component 502 side to side to assist in separating the proximal component 501 and the auxiliary component 502.

In some embodiments, the auxiliary component 502 can include a clicker device 523. The clicker device 523 can be configured to make a noise or sound to attempt to gain the attention of a pet. In some embodiments, the clicker device 523 can be partially embedded in the auxiliary component 502. The clicker device 523 can be accessible from outside the device 500. The clicker device 523 can be removably coupled to the auxiliary component. In the illustrated example, the clicker 523 is circular in shape. However, it will be understood that other shapes may be used, such as, rectangular, square, trapezoid, etc.

As described above, the proximal component 501 can include the cut-out 511. The cut-out 511 can be sized and shape to correspond to a size and shape of the clicker device 523. When the proximal component 501 is coupled with the auxiliary component 502, the cut-out 511 can extend at least partially around the clicker device 523.

FIGS. 18-26 illustrate another example embodiment of an animal treat dispensing device 600. In some embodiments, the device 600 can be a pet reward and training device. In some embodiments, the device 600 can be both an animal treat dispensing device and a pet reward and training device. Some of the features of the device 600 are similar to features of the device 200 in FIGS. 3-5 and/or the device 500 in FIGS. 9-17. Therefore, the structure and description for the various features of the device 200 and/or 500 and how it's operated and controlled in FIGS. 3-5 and FIGS. 9-17 respectively are understood to also apply to the corresponding features of the device 600 in FIGS. 18-26 where appropriate. Though the features below are described in connection with the device 600, the features may also apply to the other devices, such as devices 200 and 500 disclosed herein.

The device 600 may include a proximal component 601, an auxiliary component 602, and a distal component 603. The auxiliary component 602 may assist in securing the proximal component 601 to the distal component 603. In some embodiments, the auxiliary component 602 may be a collar. The proximal component 601 may be a semi-removable dispensing mechanism as described herein. In some instances, the proximal component 601 may be cap. In some embodiments, the cap can be a flip-top cap that can remain connected to the device 600 by a hinge 605 when in an open state. In some embodiments, the cap can be fully removed when in an open state.

In some embodiments, the distal component 603 and the auxiliary component 602 can be an integrated or unitary structure. The unitary structure can include a flexible portion corresponding to the distal component 603 and a rigid portion corresponding to the auxiliary component 602. The flexible portion can be molded over or otherwise permanently attached to the rigid portion to form the integrated or unitary structure. In some embodiments, the flexible portion may comprise silicone.

The proximal component 601 can include an opening 606 for dispensing a treat stored within the device 600. The proximal component 601 may include a stopper 607 to plug the opening 606 when the device is in a closed state. The stopper 607 can extend from a surface of a lid 608 of the proximal component 601. The lid 608 can be coupled to a base portion 609 of the proximal component 601. In some embodiments, the lid 608 can be connected to the base portion 609 via the hinge 605. The base portion 609 can be configured to couple the proximal component 601 to the auxiliary component 602. The base portion 609 can surround a portion of the auxiliary component 602 to secure the auxiliary component 602 to the proximal component 601. The proximal component 601 may have a generally flattened shape. The generally flattened shape may be beneficial in that it allows the device 600 to easily be stored within a user's pocket. The proximal component 601 may assist in maintaining the generally flattened shape of the distal component 603 and/or the auxiliary component 602.

Figure 25:
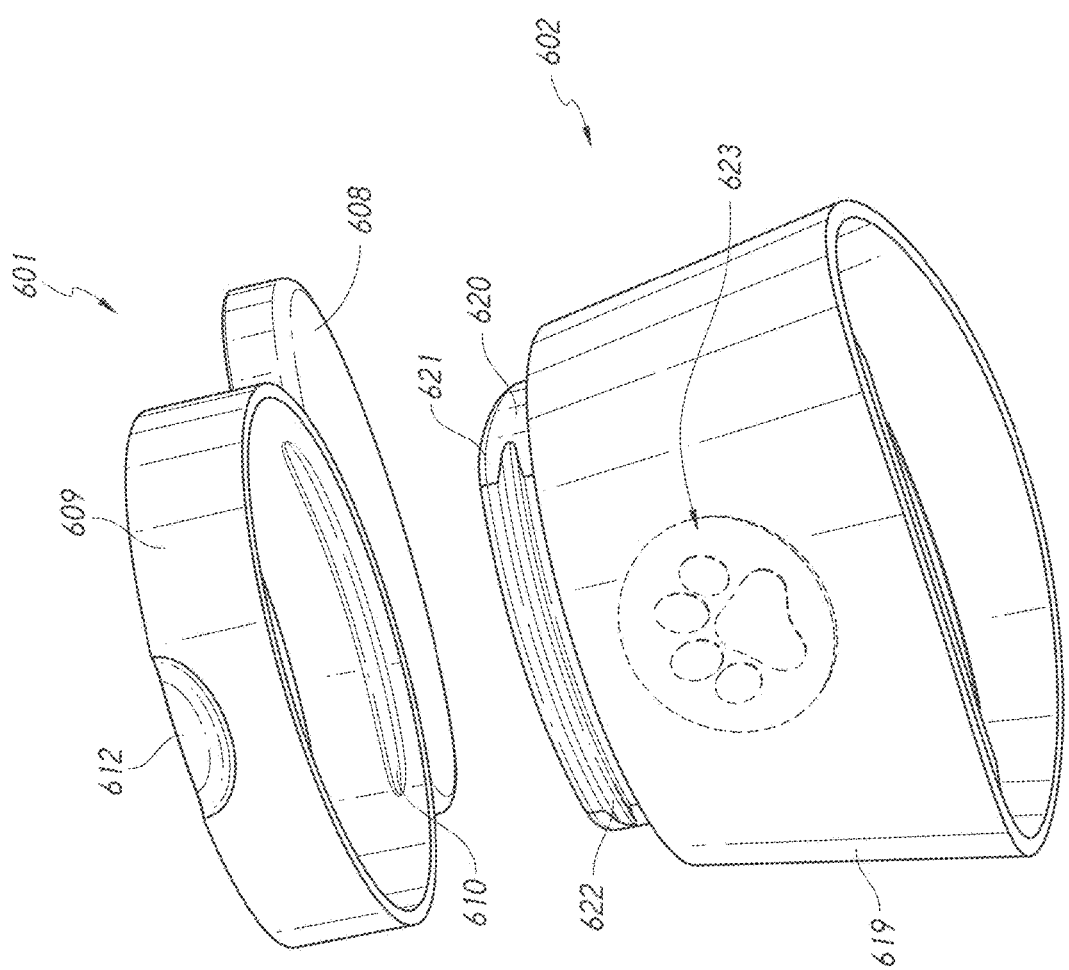
FIG. 25 illustrates an exploded view of a semi-removable dispensing mechanism and auxiliary component of the animal treat dispensing device of FIG. 18.

The base portion 609 can include one or more protrusions 610 on an inner surface of the base portion 609, as shown in FIG. 25. In some embodiments, the protrusion 610 can be an annular protrusion 610. In some embodiments, the protrusion 610 can extend around an entire inner perimeter of the inner surface. In some embodiments, the protrusion 610 can extend around only a portion of the perimeter of the inner surface. In some embodiments, the base portion 609 can include two protrusions 610 positioned opposite one another on the inner surface of the base portion 609.

In some embodiments, the base portion 609 can include a depressed or recessed area 612. The depressed or recessed area 612 can enable a user to open the cap with a single hand. This can be beneficial as the user's other hand may be occupied with a dog leash or other item.

The distal component 603 may be a housing or compartment for storing a pliable or semi-solid treat. For example, the distal component can comprise a flexible, semi-flexible, or partially flexible body in which a lickable treat (e.g., a semi-solid or pliable treat) may be stored and from which the lickable treat may be extruded and dispensed to a pet. The flexible body may include a thermally insulating material or layers.

The distal component 603 may have a generally flattened shape. The generally flattened shape may be beneficial in that it allows the device 600 to easily be stored within a user's pocket. The auxiliary component 602 may assist in maintaining the generally flattened shape of the distal component 603. For example, the auxiliary component 602 may be generally oval shaped to assist in forming the generally flattened shape of the distal component 603. A generally flattened shape may have a width that exceeds a depth of the distal component 603. A generally flattened shape may have a height that exceeds a depth of the distal component 603. In some embodiments, a face or widest side of the distal component 603 can have a general arc convex shape from one lateral side to the other lateral side. In some embodiments, a portion (e.g., an activation region or area) of the face or widest side of the distal component 603 may not have an arc. The activation region or area may be arcless, flat or planar to facilitate pressing. The activation region or area may be a concave surface to facilitate pressing. The activation region or area may be a combination of an arcless, flat, planar, and concave surface. For example, the activation region or area may have an outer portion or ring that is flat while the inner portion or ring is concave. In some cases, the activation region or area of the distal component 503 may be recessed. For example, a circle or other shaped recess may be located in the center of the distal component 603. The recess may facilitate squeezing the distal component 603 to dispense the treat.

In some embodiments, the activation region may be centered relative to the lateral sides and/or centered on the face of the distal component 603. For example, moving from one lateral side to the other lateral side, the face of the distal component 603 may have an arced or convex shaped portion, a flat, planar, and/or concave portion, and an arced or convex shaped portion. Moving from a top side to a bottom side, the face of the distal component 603 may have an arced or convex shaped portion, a flat, planar, and/or concave portion, and an arced or convex shaped portion. In some embodiments, the face of the distal component 603 and the base of the distal component 603 may have the same curvature from lateral side to lateral side and/or from top to bottom. In some embodiments, the lateral sides of the distal component 603 may curve from the face of the distal component 603 to the bottom of the distal component 603. In some embodiments, the lateral sides of the distal component 603 may curve from the top of the distal component 603 to the bottom of the distal component 603.

In some embodiments, the distal component 603 may include a through hole or opening 613. The opening 613 may be positioned at an end of the device 600 opposite the proximal component 601. The opening 613 can be used to connect the device 600 to a keychain, lanyard, or other accessory.

Figure 26:
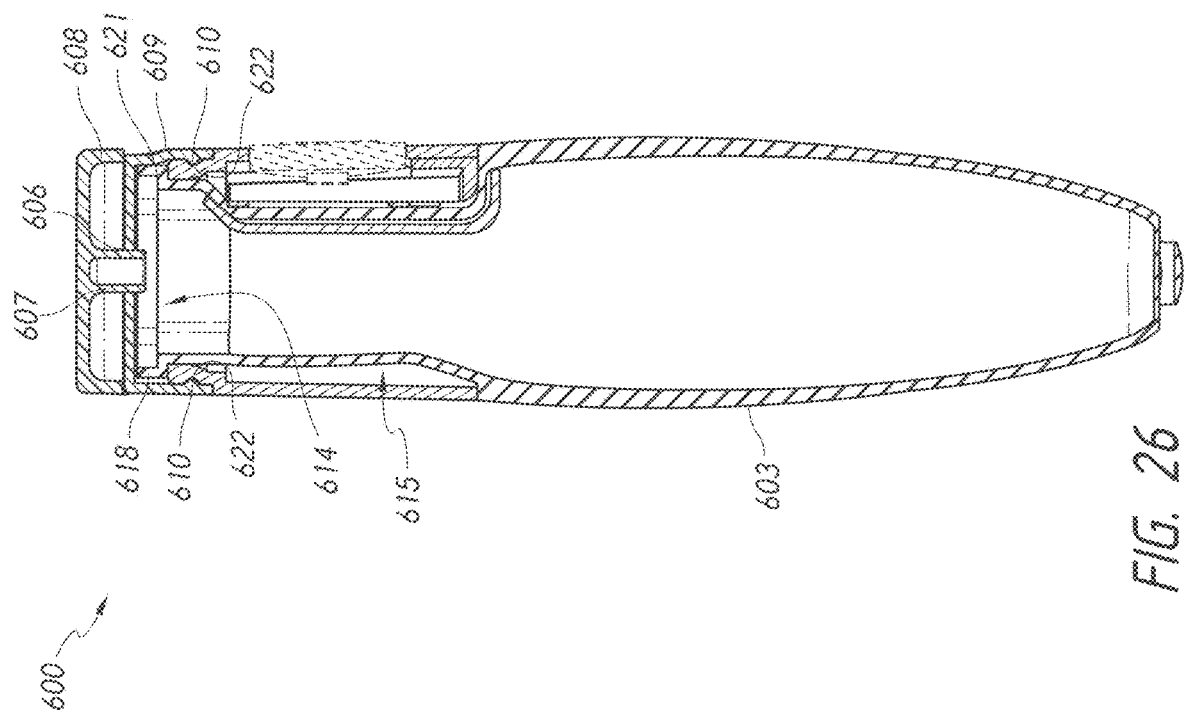
FIG. 26 illustrates a side cross-sectional view of the animal treat dispensing device of FIG. 18 taken along the line 26-26 as shown in FIG. 19.

As shown in FIG. 26, the distal component 603 can include a neck 615. The neck 615 can include a rim 618. The rim 618 can have a greater diameter than a diameter of the neck 615. In some embodiments, the rim 618 can be a flexible material. The rim 618 can encircle an opening 614. The opening 614 can be used for dispensing a treat stored within the housing. The rim 518 can assist in securing the auxiliary component 602 to the distal component 603 as described herein.

The auxiliary component 602 can include a lower portion 619 and an upper portion 620. The lower portion 619 can be configured to receive the neck 615 of the distal component 603. The auxiliary component 602 can include a ledge 621. The ledge 621 can extend around a perimeter of the upper portion 620 forming an opening. When the distal component 603 is inserted into the auxiliary component 602 through an opening in the lower portion 619 of the auxiliary component 602, the rim 618 of the distal component 603 can rest on the ledge 621. As the rim 618 of the distal component 603 is inserted through the auxiliary component 602, the rim 618 can compress or deform in order to fit through the auxiliary component 602. Once inserted through the auxiliary component 602, the rim 618 can expand to a diameter that exceeds the diameter of the ledge 621, such that the ledge 621 prevents the auxiliary component 502 from disengaging the distal component 603. The interaction between the rim 618 and the ledge 621 can assist in retaining the distal component 603 and the auxiliary component 602 together.

In some embodiments, the auxiliary component 602 can include one or more recesses 622 extending into an outer surface of the upper portion 620. The number of recesses 622 can correspond to the number of protrusions 610. The recess 622 can be an annular recess 622. The recess 622 can extend around an entire perimeter of the outer surface of the upper portion 620. The recess 622 can extend around a portion of the perimeter of the outer surface of the upper portion 620. The recess 622 can assist in securing the proximal component 601 to the auxiliary component 602. For example, as the proximal component 601 is applied to the auxiliary component 602, the protrusion 610 of the proximal component 601 can be advanced over the recess 622 of the auxiliary component 502. The protrusion 610 can engage the recess 622 to assist in securing the proximal component 601 to the auxiliary component 602. To separate the protrusion 610 and the recess 622, a user can apply a force to opposing sides of the proximal component 601 and/or the auxiliary component 602 together. For example, a user can pinch the opposing sides together. The applied force can cause the forward facing and rearward facing sides apart, thus disengaging the recess 622 and the protrusion 610.

In some embodiments, the auxiliary component 602 can include a clicker device 623. The clicker device 623 can be configured to make a noise or sound to attempt to gain the attention of a pet. In some embodiments, the clicker device 623 can be partially embedded in the auxiliary component 602. The clicker device 623 can be accessible from outside the device 600. The clicker device 623 can be removably coupled to the auxiliary component.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities, dimensions, and so forth used in the specification and claims are to be understood as being modified in all instances by the term "about." Accordingly, unless indicated to the contrary, the numerical parameters set forth in the specification are approximations that may vary depending upon the desired properties sought to be obtained by embodiments of the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several devices, methods, and materials of the present disclosure. The present disclosure is susceptible to modifications in the devices, methods, and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

Ornamental Design

In another aspect, FIGS. 9-17 and FIGS. 18-26 illustrate ornamental designs for an animal treat dispenser. Broken lines are used to illustrate features of the animal treat dispenser, which form no part of a claimed design. Applicant reserves the right to claim any unclaimed features of the design at a later date (such as in one or more divisional or continuation applications) and submits that this specification discloses and supports the claims of any unclaimed features either alone or in combination with other unclaimed and/or claimed features.

It should be appreciated that different features of the embodiments of the figures are for illustration only, and as disclosed elsewhere herein, any feature, structure, or component that is shown and/or claimed in one embodiment in this specification can be claimed with or instead of any feature, structure, or component that is claimed in any other embodiment in this specification.

These examples herein are not meant to be limiting. Applicant submits that this specification discloses and supports the claiming of any other unclaimed features, or any portion thereof, and the disclaiming of any other features claimed, or any portion thereof, in any of FIGS. 9-26.

What is claimed is:

1. An animal treat dispensing device comprising:
   a housing configured to store a pliable treat and having a generally flattened shape, the housing comprising:
   a flexible material,
   a neck having a first width, and
   a rim at an open end of the housing, the rim having a second width, the second width larger than the first width;

an auxiliary component configured to be positioned at least partially around the open end of the housing, the auxiliary component having a generally flattened shape and comprising a rim; and a cap configured to couple to the auxiliary component, the cap comprising an opening to dispense the pliable treat, wherein the rim of the housing is configured to deform as the housing is inserted into the auxiliary component and expand to rest on the rim of the auxiliary component.

2. The animal treat dispensing device of claim 1, further comprising a clicker at least partially embedded in a distal end of the animal treat dispensing device.

3. The animal treat dispensing device of claim 1, wherein the cap is a semi-removable cap configured to be operated with a single hand.

4. The animal treat dispensing device of claim 1, wherein the cap is a flip-top cap.

5. The animal treat dispensing device of claim 1, wherein the auxiliary component comprises a recess in an outer surface of the auxiliary component and wherein the cap comprises a protrusion extending from an inner surface of the cap, the protrusion configured to be received within the recess in the outer surface of the auxiliary component to secure the cap to the auxiliary component.

6. The animal treat dispensing device of claim 1, wherein the auxiliary component comprises a first protrusion extending from an outer surface of the auxiliary component, wherein the cap comprises a second protrusion extending from an inner surface of the cap, and wherein, when the cap is coupled to the auxiliary component, the first protrusion and the second protrusion secure the cap to the auxiliary component.

7. The animal treat dispensing device of claim 1, wherein the auxiliary component comprises a press-button structure and wherein the cap comprises a through hole, the press-button structure configured to extend through the through hole to secure the cap to the auxiliary component.

8. The animal treat dispensing device of claim 1, further comprising an opening extending through the housing, the opening configured to couple to at least one of a lanyard, leash, a retractable key holder, and keychain.

9. The animal treat dispensing device of claim 1, wherein the housing comprises a temperature-insulating material.

10. The animal treat dispensing device of claim 1, further comprising a storage component coupled to the housing.

11. An animal treat dispensing device comprising:
a housing configured to store a pliable treat and having a generally flattened shape, the housing comprising:
a flexible portion, and
a rigid portion comprising an open end; and
a semi-openable cap configured to couple to the open end of the rigid portion of the housing, the semi-openable cap comprising a generally flattened shape and an opening to dispense the pliable treat,
wherein the rigid portion of the housing is an auxiliary component separate from the flexible portion of the housing,
wherein the auxiliary component comprises a press-button structure, and
wherein the semi-openable cap comprises a through hole, the press-button structure configured to extend through the through hole to secure the semi-openable cap to the auxiliary component.

12. The animal treat dispensing device of claim 11, wherein the semi-openable cap is configured to be operated with a single hand.

13. The animal treat dispensing device of claim 12, wherein the semi-openable cap is a flip-top cap.

14. The animal treat dispensing device of claim 11, further comprising a clicker at least partially embedded in the animal treat dispensing device.

15. The animal treat dispensing device of claim 11, wherein the flexible portion of the housing and the rigid portion of the housing form an integral structure.

16. The animal treat dispensing device of claim 11, further comprising an opening extending through the housing, the opening configured to couple to at least one of a lanyard, leash, a retractable key holder, and keychain.

17. The animal treat dispensing device of claim 11, wherein the housing comprises a temperature-insulating material.

18. The animal treat dispensing device of claim 11, further comprising a storage component coupled to the housing.

19. An animal treat dispensing device comprising:
a housing configured to store a pliable treat and having a generally flattened shape, the housing comprising:
a flexible portion, and
a rigid portion comprising an open end; and
a semi-openable cap configured to couple to the open end of the rigid portion of the housing, the semi-openable cap comprising a generally flattened shape and an opening to dispense the pliable treat,
wherein the rigid portion of the housing is an auxiliary component separate from the flexible portion of the housing, and
wherein the auxiliary component comprises a recess in an outer surface of the auxiliary component and wherein the semi-openable cap comprises a protrusion extending from an inner surface of the semi-openable cap, the protrusion configured to be received within the recess in the outer surface of the auxiliary component to secure the semi-openable cap to the auxiliary component.

20. An animal treat dispensing device comprising:
a housing configured to store a pliable treat and having a generally flattened shape, the housing comprising:
a flexible portion, and
a rigid portion comprising an open end; and
a semi-openable cap configured to couple to the open end of the rigid portion of the housing, the semi-openable cap comprising a generally flattened shape and an opening to dispense the pliable treat,
wherein the rigid portion of the housing is an auxiliary component separate from the flexible portion of the housing,
wherein the auxiliary component comprises a first protrusion extending from an outer surface of the auxiliary component, wherein the semi-openable cap comprises a second protrusion extending from an inner surface of the semi-openable cap, and wherein, when the semi-openable cap is coupled to the auxiliary component, the first protrusion and the second protrusion secure the semi-openable cap to the auxiliary component.

21. An animal treat dispensing device comprising:
a housing configured to store a pliable treat, the housing comprising an open end;
a cap configured to couple to the open end of the housing, the cap comprising an opening to dispense the pliable treat; and
a clicker at least partially embedded into an outer surface of the animal treat dispensing device, the clicker configured to generate a sound when actuated by a user, wherein the clicker is at least partially embedded into an outer surface of the cap.

22. The animal treat dispensing device of claim 21, further comprising an opening extending through the housing, the opening configured to couple to at least one of a lanyard, leash, a retractable key holder, and keychain.

23. The animal treat dispensing device of claim 21, wherein the housing comprises a temperature-insulating material.

24. The animal treat dispensing device of claim 21, further comprising a storage component coupled to the housing.

25. The animal treat dispensing device of claim 21, wherein the cap is a semi-removable cap configured to be operated with a single hand.

26. An animal treat dispensing device comprising:
- a housing configured to store a pliable treat, the housing comprising an open end;
- a cap configured to couple to the open end of the housing, the cap comprising an opening to dispense the pliable treat;
- a clicker at least partially embedded into an outer surface of the animal treat dispensing device, the clicker configured to generate a sound when actuated by a user; and
- an auxiliary component, the auxiliary component configured to couple the cap to the open end of the housing, wherein the clicker is at least partially embedded into an outer surface of the auxiliary component.

27. The animal treat dispensing device of claim 26, wherein the cap comprises a cut-out configured to partially surround the clicker.

* * * * *